United States Patent
Martino

(10) Patent No.: US 11,137,190 B2
(45) Date of Patent: Oct. 5, 2021

(54) METHOD AND SYSTEM FOR MAINTAINING TEMPERATURE-SENSITIVE MATERIALS WITHIN A DESIRED TEMPERATURE RANGE FOR A PERIOD OF TIME

(71) Applicant: Cold Chain Technologies, LLC, Franklin, MA (US)

(72) Inventor: Peter Martino, Danbury, NH (US)

(73) Assignee: COLD CHAIN TECHNOLOGIES, LLC, Franklin, MA (US)

( * ) Notice: Subject to any disclaimer, the term of this patent is extended or adjusted under 35 U.S.C. 154(b) by 122 days.

(21) Appl. No.: 16/457,871

(22) Filed: Jun. 28, 2019

(65) Prior Publication Data

US 2020/0408453 A1     Dec. 31, 2020

(51) Int. Cl.
*F25D 3/08*     (2006.01)
*B65D 81/18*    (2006.01)
(Continued)

(52) U.S. Cl.
CPC .............. *F25D 3/08* (2013.01); *B65D 81/18* (2013.01); *B65D 81/3825* (2013.01); *F25D 3/00* (2013.01);
(Continued)

(58) Field of Classification Search
CPC ........ F25D 3/08; F25D 3/00; F25D 2331/804; F25D 2600/04; B65D 81/18; B65D 81/3825
See application file for complete search history.

(56) References Cited

U.S. PATENT DOCUMENTS

| 5,899,088 A | 5/1999 | Purdum |
| 5,924,302 A | 7/1999 | Derifield |

(Continued)

FOREIGN PATENT DOCUMENTS

| DE | 202006004344 U1 | 7/2006 |
| EP | 1006058 A1 | 6/2000 |

(Continued)

OTHER PUBLICATIONS

Oré et al., "Review on phase change materials (PCMs) for cold thermal energy storage applications," Applied Energy, 99:513-533 (2012).

(Continued)

*Primary Examiner* — Ana M Vazquez
(74) *Attorney, Agent, or Firm* — Kriegsman & Kriegsman

(57) ABSTRACT

Method and system for maintaining temperature-sensitive materials within a target temperature range for an extended time. In one embodiment, the system keeps materials within a temperature range of +2° C. to +8° C. and includes an insulated container, a product box, ice packs, and organic phase-change material (PCM) packs. The ice packs are preconditioned to a very low temperature, such as −20° C. The organic PCM packs do not require preconditioning and may be kept at room temperature. In use, the frozen ice packs and the warm organic PCM packs may be loaded into the insulated container, together with a payload in the product box. Preferably, the frozen ice packs are sandwiched between a pair of organic PCM packs on each face of the product box. The masses of ice and organic PCM are selected so that, upon thermal equilibration, the ice and organic PCM are within the target temperature range.

35 Claims, 12 Drawing Sheets

(51) Int. Cl.
*B65D 81/38* (2006.01)
*F25D 3/00* (2006.01)

(52) U.S. Cl.
CPC .... *F25D 2201/12* (2013.01); *F25D 2331/804* (2013.01); *F25D 2600/04* (2013.01)

(56) References Cited

U.S. PATENT DOCUMENTS

| | | | |
|---|---|---|---|
| 6,116,042 | A | 9/2000 | Purdum |
| 6,482,332 | B1 | 11/2002 | Malach |
| 6,645,598 | B2 | 11/2003 | Alderman |
| 6,868,982 | B2 | 3/2005 | Gordon |
| 6,875,486 | B2 | 4/2005 | Miller |
| 7,240,513 | B1 | 7/2007 | Conforti |
| 7,257,963 | B2 | 8/2007 | Mayer |
| 7,500,593 | B2 | 3/2009 | Mayer |
| 7,641,812 | B2 | 1/2010 | Alderman |
| 7,704,584 | B2 | 4/2010 | Alderman |
| 7,849,708 | B2 | 12/2010 | Goncharko et al. |
| 8,074,465 | B2 | 12/2011 | Heroux et al. |
| 8,156,703 | B2 | 4/2012 | Alderman |
| 8,250,882 | B2 | 8/2012 | Mustafa et al. |
| 8,607,581 | B2 | 12/2013 | Williams et al. |
| 8,887,515 | B2 | 11/2014 | Patstone |
| 8,938,986 | B2 | 1/2015 | Matta et al. |
| 9,045,278 | B2 | 6/2015 | Mustafa et al. |
| 9,151,531 | B2 | 10/2015 | Wengreen et al. |
| 9,180,998 | B2 | 11/2015 | Banks et al. |
| 9,267,722 | B2 | 2/2016 | Blezard et al. |
| 9,366,469 | B2 | 6/2016 | Chapman, Jr. |
| 9,429,350 | B2 | 8/2016 | Chapman, Jr. |
| 9,556,373 | B2 | 1/2017 | Formato et al. |
| 9,581,374 | B2 | 2/2017 | Kuhn et al. |
| 9,598,622 | B2 | 3/2017 | Formato et al. |
| 9,707,156 | B2 | 7/2017 | Wengreen et al. |
| 9,814,651 | B2 | 11/2017 | Wengreen et al. |
| 9,877,894 | B2 | 1/2018 | Wengreen et al. |
| 9,913,777 | B2 | 3/2018 | Wengreen et al. |
| 9,939,207 | B2 | 4/2018 | Kuhn et al. |
| 9,956,140 | B2 | 5/2018 | Wengreen et al. |
| 9,957,099 | B2 | 5/2018 | White et al. |
| 10,077,389 | B2 | 9/2018 | Formato et al. |
| 10,309,709 | B2 | 6/2019 | Emond et al. |
| 10,549,900 | B2 * | 2/2020 | McCormick ....... B65D 81/3827 |
| 10,583,978 | B2 | 3/2020 | Longley et al. |
| 10,604,326 | B2 | 3/2020 | Longley et al. |
| 10,661,969 | B2 | 5/2020 | Pranadi et al. |
| 10,829,675 | B2 | 11/2020 | Formato et al. |
| 2004/0151851 | A1 * | 8/2004 | Miller ................ B65D 81/3823 428/34.2 |
| 2007/0051734 | A1 | 3/2007 | Kuhn |
| 2010/0314397 | A1 | 12/2010 | Williams et al. |
| 2011/0290792 | A1 | 12/2011 | Krzak et al. |
| 2012/0156002 | A1 * | 6/2012 | Maruhashi ......... B65D 81/3816 414/800 |
| 2012/0197810 | A1 | 8/2012 | Haarmann et al. |
| 2014/0343493 | A1 | 11/2014 | Wengreen |
| 2015/0166244 | A1 | 6/2015 | Wood et al. |
| 2016/0262979 | A1 | 9/2016 | Wengreen et al. |
| 2016/0362240 | A1 | 12/2016 | Ferracamo, Jr. |
| 2017/0121097 | A1 | 5/2017 | Pranadi et al. |
| 2018/0036202 | A1 | 2/2018 | Wengreen et al. |
| 2018/0093816 | A1 | 4/2018 | Longley et al. |
| 2018/0100682 | A1 | 4/2018 | Nilsen et al. |
| 2018/0320947 | A1 * | 11/2018 | Jain .................... B65D 81/3825 |
| 2018/0328644 | A1 | 11/2018 | Rizzo et al. |
| 2019/0210790 | A1 | 7/2019 | Rizzo et al. |
| 2020/0002075 | A1 | 1/2020 | Lee et al. |
| 2020/0231362 | A1 | 7/2020 | Kulangara et al. |
| 2021/0024270 | A1 | 1/2021 | Mirzaee Kakhki |
| 2021/0070539 | A1 | 3/2021 | Chasteen et al. |

FOREIGN PATENT DOCUMENTS

| | | |
|---|---|---|
| WO | 2017220953 A1 | 12/2017 |
| WO | 2017220954 A1 | 12/2017 |
| WO | 2018213348 A2 | 11/2018 |

OTHER PUBLICATIONS

Pack-out Sheet for KoolTemp GTS Extreme 7L, +2° C. to +8° C., Universal Packout, Cold Chain Technologies, Franklin, MA (2014).
Pack-out Sheet for KoolTemp GTS Extreme 45L, +15° C. to +25° C., Universal Packout, Cold Chain Technologies, Franklin, MA (2014).

* cited by examiner

METHOD AND SYSTEM FOR MAINTAINING TEMPERATURE-SENSITIVE MATERIALS WITHIN A DESIRED TEMPERATURE RANGE FOR A PERIOD OF TIME

BACKGROUND OF THE INVENTION

The present invention relates generally to methods and systems for maintaining temperature-sensitive materials within a desired temperature range for a period of time and relates more particularly to a novel method and system for maintaining temperature-sensitive materials within a desired temperature range for a period of time.

There is a continuing need for systems that can maintain temperature-sensitive materials within a desired temperature range for an extended period of time. For example, many pharmaceuticals, foods, medical devices, beverages, and other temperature-sensitive materials must be maintained within a particular temperature range (such as, for example, +2° C. to +8° C.) in order to prevent the spoilage of such materials. As can readily be appreciated, the maintenance of such materials within a desired temperature range while such materials are being transported can be challenging. One way in which such temperature maintenance may be achieved is by use of active temperature-control devices, such as electrically-powered refrigeration units or the like. However, as can be appreciated, such active temperature-control devices add considerable expense to transportation costs.

An alternative method for temperature maintenance is through the use of passive temperature-control members, such as, but not limited to, ice packs, gel packs, and the like. Such passive temperature-control members typically comprise a quantity of a phase-change material (PCM) disposed within a suitable container. Many different types of passive temperature-control members exist, some types comprising an organic phase-change material and some other types comprising an aqueous phase-change material. An example of a passive temperature-control member comprising an organic phase-change material is disclosed in U.S. Pat. No. 10,077,389 B2, inventors Formato et al., which issued Sep. 18, 2018, and which is incorporated herein by reference. An example of a passive temperature-control member comprising an aqueous phase-change material is a quantity of water or a quantity of an aqueous salt solution packaged inside a film pouch or a bottle. To provide some support to a film pouch containing water or an aqueous salt solution, a stiffening member, such as a foam brick, pad or mat, is sometimes disposed within the pouch. Also, in some cases, a thickener, such as hydroxyethyl cellulose (HEC), carboxymethylcellulose (CMC) and sodium polyacrylate, is added to the water or salt solution to form a gel-like composition.

Typically, prior to use, one or more passive temperature-control members employing the same type of phase-change material are preconditioned to a desired or target temperature. Such preconditioning typically involves placing the one or more passive temperature-control members in a temperature-controlled environment (e.g., inside a refrigerator or freezer) for a period of time until the one or more passive temperature-control members reach the desired or target temperature. For example, one or more water-containing packs may be preconditioned in a freezer operating at a subzero Celsius temperature until such time as the water in the packs becomes ice at the temperature of the freezer. Alternatively, as another example, one or more packs containing a particular type of organic phase-change material may be preconditioned in a refrigerator operating at, around or below the solid/liquid phase-change temperature of the phase-change material until such time as the phase-change material cools to the temperature of the refrigerator. Once the one or more passive temperature-control members containing the same type of phase-change material have been preconditioned to a desired or target temperature, the preconditioned temperature-control members are then typically positioned within an insulated container, together with a payload. The installation of one or more preconditioned passive temperature-control members and a payload in an insulated container is commonly referred to as "packout."

An alternative technique for preconditioning one or more passive temperature-control members is disclosed in U.S. Pat. No. 9,581,374 B2, inventors Kuhn et al., which issued Feb. 28, 2017, and which is incorporated herein by reference. According to one embodiment of the aforementioned patent, a thermally insulated container is provided, the thermally insulated container including thin walls used to define a central receiving space and a pair of side spaces. Passive temperature-control members, which are referred to in the aforementioned patent as latent heat storage elements, are positioned in the side spaces. The latent heat storage elements have a preconditioned target temperature that is slightly higher than 0° C. A mass of crushed ice is placed in the central receiving space, the mass of crushed ice being selected to cool the latent heat storage elements from an initial temperature to the target temperature by the time that the crushed ice has substantially melted. With both the latent heat storage elements and the crushed ice arranged in their respective spaces, the thermally insulated container is then closed until the latent heat storage elements are cooled to the target temperature. With the latent heat storage elements thus preconditioned, packout is then performed. Specifically, with the preconditioned latent storage elements remaining in place in the container, the melted ice and/or any remaining crushed ice is removed from the central receiving space of the container, and a payload is placed in the central receiving space of the container.

Although the approaches described above may be adequate in some cases for short periods of time, these approaches are generally inadequate to provide protection to temperature-sensitive materials that must be maintained at a refrigerated temperature (e.g., +2° C. to +8° C.) for an extended period of time (e.g. one or more days), particularly when the container holding the temperature-sensitive materials and passive temperature-control members is exposed to warm ambient temperatures (e.g., room temperature or warmer). The limited utility of the above approaches is due, in large part, to the fact that the preconditioned phase-change material tends to warm up over time, thereby losing its effectiveness as a heat sink.

As a result, one approach to improving the duration of thermal protection has been to use, in the same shipping system, two different types of preconditioned passive temperature-control members, a first type comprising a phase-change material having a phase-change temperature that is within the desired or target temperature range for the temperature-sensitive materials and a second type comprising a phase-change material having a phase-change temperature that is below (or otherwise outside) the desired or target temperature range for the temperature-sensitive materials. As an example, where the desired temperature range for the temperature-sensitive material is +2° C. to +8° C., the phase-change material for the first type of passive temperature-control member may be, for example, n-tetradecane, which has a solid/liquid phase-change temperature of about +5° C., and the phase-change material for the second type of passive temperature-control member may be, for example, water, which has a solid/liquid phase-change temperature of 0° C.

In accordance with the above approach, prior to packout, the first type of passive temperature-control member is typically preconditioned at or around the solid/liquid phase-change temperature of its phase-change material so that it is at a temperature within the desired or target temperature range for the temperature-sensitive materials, and the second type of passive temperature-control member is typically preconditioned well below the solid/liquid phase-change temperature of its phase-change material so that it is at a temperature well below the desired or target temperature range for the temperature-sensitive materials. (In some cases, it may be desirable to precondition the first type of passive temperature-control member so that its phase-change material is partially frozen. Such partial freezing ensures that the phase-change material is preconditioned precisely to its phase-change temperature, as opposed to being slightly above or slightly below its phase-change temperature.) Then, once the passive temperature-control members have been preconditioned in the above manner, packout is performed. Specifically, the two types of passive temperature-control members are loaded into an insulated shipping container with a payload, the first type of passive temperature-control member typically being positioned in an inner position that is more proximate to the payload and the second type of passive temperature-control member typically being positioned in an outer position that is more distal to the payload. As can be appreciated, with the two types of passive-temperature-control members arranged around the payload in this fashion, the second type of passive temperature-control member tends to slow down the warming up of the first type of passive temperature-control member, thereby extending the duration of thermal protection provided to the temperature-sensitive materials.

While the above approach is generally effective at providing extended thermal protection, one disadvantage of the approach is that the two different types of passive temperature-control members must be preconditioned at different temperatures prior to packout. This typically requires that there be at least two types of preconditioning units (e.g., refrigerators, freezers, etc.) so that one preconditioning unit may be set at one preconditioning temperature and so that another preconditioning unit may be set at another (i.e., different) preconditioning temperature. As can be appreciated, the use of multiple types of preconditioning units increases operating costs and requires increased space. Also, where it is desirable to precondition a phase-change material so that it is only partially frozen, it may be difficult to reliably achieve such a result using a conventional preconditioning unit.

Documents that may be of interest may include the following, all of which are incorporated herein by reference: U.S. Pat. No. 9,598,622 B2, inventors Formato et al., which issued Mar. 21, 2017; U.S. Pat. No. 9,556,373 B2, inventors Formato et al., which issued Jan. 31, 2017; U.S. Pat. No. 9,429,350 B2, inventor Chapman, Jr., which issued Aug. 30, 2016; U.S. Pat. No. 9,366,469 B2, inventor Chapman, Jr., which issued Jun. 14, 2016; U.S. Pat. No. 9,045,278 B2, inventors Mustafa et al., which issued Jun. 2, 2015; U.S. Pat. No. 8,938,986 B2, inventors Matta et al., which issued Jan. 27, 2015; U.S. Pat. No. 8,887,515 B2, inventor Patstone, which issued Nov. 18, 2014; U.S. Pat. No. 8,607,581 B2, inventors Williams et al., which issued Dec. 17, 2013; U.S. Pat. No. 8,250,882 B2, inventors Mustafa et al., which issued Aug. 28, 2012; U.S. Pat. No. 8,074,465 B2, inventors Heroux et al., which issued Dec. 13, 2011; U.S. Pat. No. 7,849,708 B2, inventor Goncharko et al., which issued Dec. 14, 2010; U.S. Pat. No. 7,257,963 B2, inventor Mayer, which issued Aug. 21, 2007; U.S. Pat. No. 6,875,486 B2, inventor Miller, which issued Apr. 5, 2005; U.S. Pat. No. 6,482,332 B1, inventor Malach, which issued Nov. 19, 2002; U.S. Pat. No. 6,116,042, inventor Purdum, which issued Sep. 12, 2000; U.S. Pat. No. 5,924,302, inventor Derifield, which issued Jul. 20, 1999; U.S. Pat. No. 5,899,088, inventor Purdum, which issued May 4, 1999; U.S. Patent Application Publication No. US 2018/0320947 A1, inventors Jain et al., which published Nov. 8, 2018; U.S. Patent Application Publication No. US 2018/0093816 A1, inventors Longley et al., which published Apr. 5, 2018; U.S. Patent Application Publication No. US 2017/0121097 A1, inventors Fery Pranadi et al., which published May 4, 2017; U.S. Patent Application Publication No. US 2016/0362240 A1, inventors Ferracamo, Jr., which published Dec. 15, 2016; U.S. Patent Application Publication No. US 2011/0290792 A1, inventors Krzak et al., which published Dec. 1, 2011; PCT International Publication No. WO 2018/213348 A2, published Nov. 22, 2018; U.S. patent application Ser. No. 16/184,878, inventors Anthony Rizzo et al., which was filed Nov. 8, 2018; U.S. patent application Ser. No. 16/441,833, inventors TzeHo Lee et al., which was filed Jun. 14, 2019; and Oro et al., "Review on phase change materials (PCMs) for cold thermal energy storage applications," Applied Energy, 99:513-533 (2012).

SUMMARY OF THE INVENTION

It is an object of the present invention to provide a novel method for maintaining temperature-sensitive materials within a desired temperature range for a period of time.

It is another object of the present invention to provide a method as described above that addresses at least some of the shortcomings described above in connection with existing methods for maintaining temperature-sensitive materials within a desired temperature range for a period of time.

Therefore, according to one aspect of the invention, there is provided a method for maintaining one or more temperature-sensitive materials within a target temperature range for a period of time, the method comprising (a) providing an insulated container, a first phase-change material, and a second phase-change material, wherein the first and second phase-change materials differ from one another in chemical composition, wherein the first phase-change material has a mass, and wherein the second phase-change material has a mass; (b) preconditioning the first phase-change material to a preconditioning temperature below the target temperature range; (c) storing the second phase-change material at a temperature above the target temperature range; (d) then, loading the first phase-change material and the second phase-change material into the insulated container so as to permit heat exchange to occur between the first and second phase-change materials with minimal heat loss, wherein the masses of the first and second phase-change materials are selected so that, at thermal equilibrium between the first and second phase-change materials, the first and second phase-change materials are within the target temperature range; and (e) loading one or more temperature-sensitive materials into the insulated container; (f) wherein step (e) is performed before the second phase-change material has cooled to within the target temperature range.

In a more detailed feature of the invention, the second phase-change material may have a phase-change temperature within the target temperature range, and, at thermal equilibrium between the first and second phase-change materials, the second phase-change material may be at said phase-change temperature.

In a more detailed feature of the invention, the first phase-change material may comprise an aqueous phase-change material, and the second phase-change material may comprise an organic phase-change material.

In a more detailed feature of the invention, the first phase-change material may be water.

In a more detailed feature of the invention, the second phase-change material may comprise at least one n-alkane.

In a more detailed feature of the invention, the first phase-change material may be water, and the preconditioning step may comprise preconditioning the first phase-change material to a temperature of −20° C.

In a more detailed feature of the invention, the second phase-change material may be a liquid at room temperature, and the storing step may comprise storing the second phase-change material at room temperature.

In a more detailed feature of the invention, the one or more temperature-sensitive materials may be loaded into the insulated container substantially concurrently with the loading of the first and second phase-change materials into the insulated container.

In a more detailed feature of the invention, the target temperature range may be +2° C. to +8° C., the second phase-change material may have a solid/liquid phase-change temperature within the target temperature range, and, at thermal equilibrium between the first and second phase-change materials, the second phase-change material may be at said solid/liquid phase-change temperature.

In a more detailed feature of the invention, the second phase-change material may be split into two volumes, and the first phase-change material may be located between the two volumes of the second phase-change material.

In a more detailed feature of the invention, the two volumes of the second phase-change material may be equal in mass.

In a more detailed feature of the invention, the two volumes of the second phase-change material may be unequal in mass.

In a more detailed feature of the invention, the first phase-change material may be split into two volumes separated by an insulating material.

In a more detailed feature of the invention, the two volumes of the first phase-change material may be unequal in mass.

It is also an object of the present invention to provide a novel system for maintaining temperature-sensitive materials within a desired temperature range for a period of time.

Therefore, according to another aspect of the invention, there is provided a system for use in maintaining one or more temperature-sensitive materials within a target temperature range for a period of time, the system comprising (a) an insulated container, the insulated container comprising a cavity; (b) a product box for holding a payload, the product box being positioned within the cavity; (c) a first passive temperature-control member positioned within the cavity, the first passive temperature-control member comprising a first phase-change material, the first phase-change material having a mass and being thermally preconditioned to a first temperature, the first temperature being below the target temperature range; (d) a second passive temperature-control member positioned within the cavity, the second passive temperature-control member comprising a second phase-change material, the second phase-change material being different in chemical composition from the first phase-change material, the second phase-change material having a mass and being at a second temperature, the second temperature being above the target temperature range; and (e) a third passive temperature-control member positioned within the cavity, the third passive temperature-control member comprising a third phase-change material, the third phase-change material being different in chemical composition from the first phase-change material, the third phase-change material having a mass and being at a third temperature, the third temperature being above the target temperature range; (f) wherein the masses of the first, second and third phase-change materials are selected so that, at thermal equilibrium between the first, second, and third phase-change materials, the first, second, and third phase-change materials are within the target temperature range.

In a more detailed feature of the invention, the second and third phase-change materials may be identical in chemical composition.

In a more detailed feature of the invention, the second and third phase-change materials may have a phase-change temperature within the target temperature range.

In a more detailed feature of the invention, the second and third phase-change materials may be identical in mass.

In a more detailed feature of the invention, the second and third phase-change materials may differ in mass.

In a more detailed feature of the invention, the insulated container may comprise at least a first wall, the product box may comprise at least a first face, each of the first passive temperature-control member, the second passive temperature-control member, and the third passive temperature-control member may be positioned between the first face and the first wall, and the first passive temperature-control member may be positioned between the second passive temperature-control member and the third passive temperature-control member.

In a more detailed feature of the invention, the second and third phase-change materials may differ in chemical composition.

In a more detailed feature of the invention, the second phase-change material may have a phase-change temperature at a lower end of the target temperature range, and the third phase-change material may have a phase-change temperature at an upper end of the target temperature range.

In a more detailed feature of the invention, the system may further comprise a payload, and the payload may be positioned within the product box.

According to still another aspect of the invention, there is provided a system for use in maintaining one or more temperature-sensitive materials within a target temperature range for a period of time, the system comprising (a) an insulated container, the insulated container comprising a cavity; (b) a product box, the product box being disposed within the cavity of the insulated container, the product box being constructed to hold one or more temperature-sensitive materials; (c) a first phase-change material disposed within the cavity of the insulated container, the first phase-change material having a mass and being thermally preconditioned to a first temperature, the first temperature being below the target temperature range; (d) a second phase-change material disposed within the cavity of the insulated container, the second phase-change material having a mass and being different in chemical composition than the first phase-change material, the second phase-change material being at a second temperature, the second temperature being above the target temperature range; and (e) a third phase-change material disposed within the cavity of the insulated container, the third phase-change material being different in chemical composition from the first phase-change material and identical in chemical composition to the second phase-change material, the third phase-change material having a mass and being at a third temperature, the third temperature being identical to the second temperature; (f) wherein the second phase-change material is more proximal to the product box, wherein the third phase-change material is more distal to the product box, wherein the first phase-change material is disposed between the first and second phase-change materials, and wherein the masses of the first, second and third phase-change materials are selected so that, at thermal equilibrium between the first, second and third phase-change materials, the first, second and third phase-change materials are within the target temperature range.

In a more detailed feature of the invention, the masses of the second and third phase-change materials may be equal.

In a more detailed feature of the invention, the masses of the second and third phase-change materials may be unequal.

In a more detailed feature of the invention, the mass of the second phase-change material may be greater than the mass of the third phase-change material.

In a more detailed feature of the invention, the mass of the third phase-change material may be greater than the mass of the second phase-change material.

In a more detailed feature of the invention, the system may further comprise an insulating member disposed between the product box and the second phase-change material.

In a more detailed feature of the invention, the first phase-change member may be split into two subvolumes separated by an insulating member.

According to still yet another aspect of the invention, there is provided a system for use in maintaining one or more temperature-sensitive materials within a target temperature range for a period of time, the system comprising (a) an insulated container, the insulated container comprising a cavity; (b) a product box for holding a payload, the product box being positioned within the cavity; (c) a first phase-change material, the first phase-change material having a mass and being thermally preconditioned to a first temperature, the first temperature being below the target temperature range; (d) a second phase-change material, the second phase-change material being different in chemical composition from the first phase-change material, the second phase-change material having a mass and being at a second temperature, the second temperature being above the target temperature range; (e) wherein the masses of the first and second phase-change materials are selected so that, at thermal equilibrium between the first and second phase-change materials, the first and second phase-change materials are within the target temperature range.

According to a further aspect of the invention, there is provided a system for use in maintaining one or more temperature-sensitive materials within a target temperature range for a period of time, the system comprising (a) an insulated container, the insulated container comprising at least a first wall and a cavity; (b) a product box for holding a payload, the product box being positioned within the cavity, the product box comprising a first face; (c) a first passive temperature-control member disposed within the cavity and positioned between the first wall and the first face, the first passive temperature-control member comprising a water-based phase-change material, the water-based phase-change material having a mass and being thermally preconditioned to a first temperature, the first temperature being below the target temperature range; (d) a second passive temperature-control member disposed within the cavity and positioned between the first passive temperature-control member and the first face, the second passive temperature-control member comprising a first organic phase-change material, the first organic phase-change material having a mass and being at a second temperature, the second temperature being above the target temperature range; (e) a third passive temperature-control member disposed within the cavity and positioned between the first passive temperature-control member and the first wall, the third passive temperature-control member comprising a third organic phase-change material, the third organic phase-change material having a mass and being at a third temperature, the third temperature being above the target temperature range; (f) wherein the masses of the first, second and third phase-change materials are selected so that, at thermal equilibrium between the first, second and third phase-change materials, the first, second and third phase-change materials are within the target temperature range.

In a more detailed feature of the invention, the second and third organic phase-change materials may be identical in chemical composition, and the second and third temperatures may be identical.

For purposes of the present specification and claims, various relational terms like "top," "bottom," "proximal," "distal," "upper," "lower," "front," and "rear" may be used to describe the present invention when said invention is positioned in or viewed from a given orientation. It is to be understood that, by altering the orientation of the invention, certain relational terms may need to be adjusted accordingly.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions for purposes of explication. In the drawings wherein like reference numerals represent like parts.

DETAILED DESCRIPTION OF THE INVENTION

Figure 1:
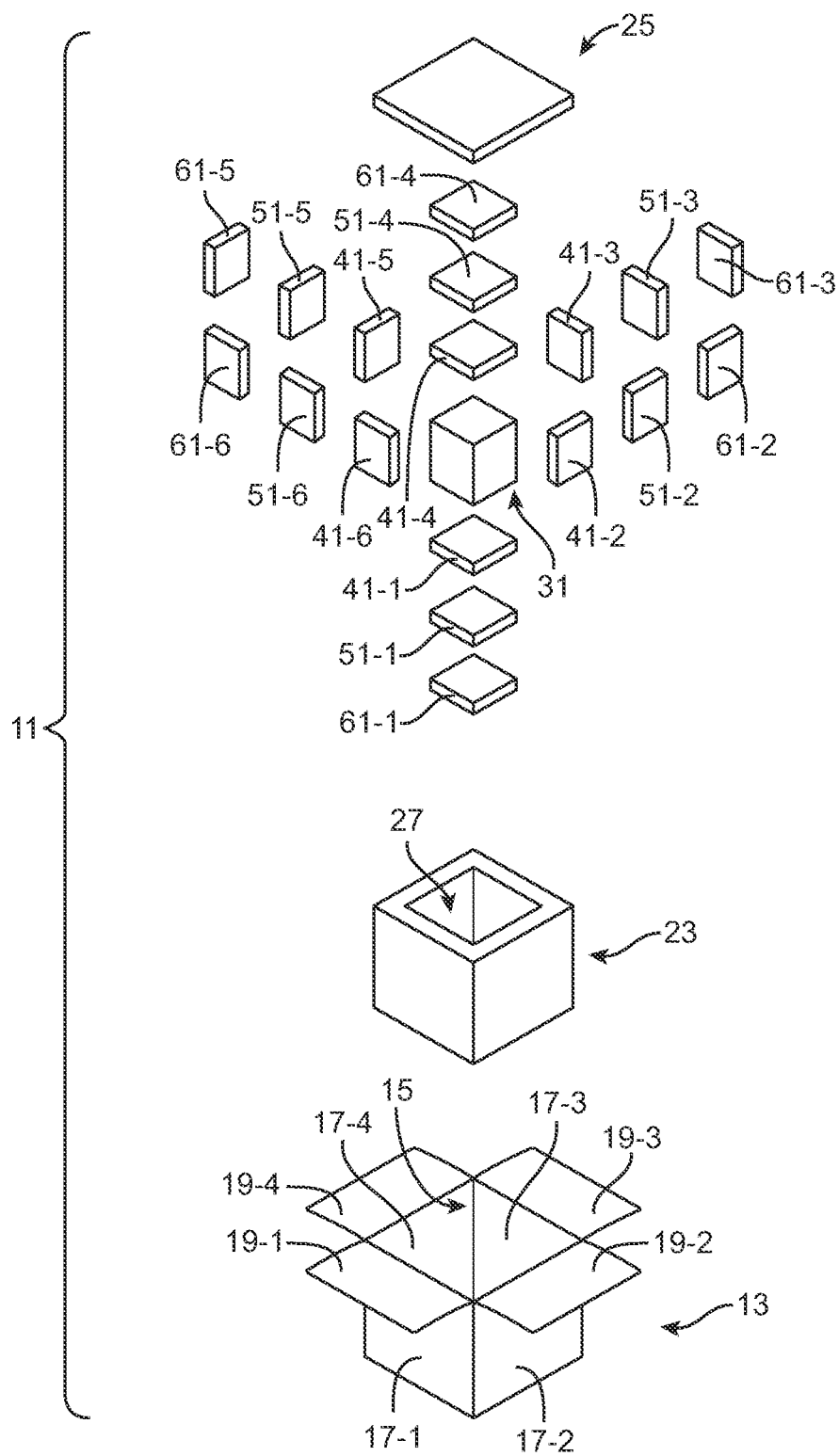
FIG. 1 is an exploded perspective view of a first embodiment of a system for maintaining temperature-sensitive materials within a desired temperature range for a period of time, the system being constructed according to the teachings of the present invention.

The present invention is directed at a novel method and system for maintaining temperature-sensitive materials within a desired temperature range for a period of time. More specifically, the present invention is directed at a method and system that utilizes a plurality of different passive temperature-control members, some of the passive temperature-control members comprising a first type of phase-change material (PCM) and others of the passive temperature-control members comprising a second type of PCM, the second type of PCM being different than the first type of PCM. In accordance with the present invention, the passive temperature-control members comprising the first type of PCM may be preconditioned prior to packout whereas the passive temperature-control members comprising the second type of PCM need not be preconditioned prior to packout and may be stored, for example, at room temperature prior to packout. Then, following packout, the passive temperature-control members comprising the first PCM may be used to bring the passive temperature-control members comprising the second PCM to a target temperature or temperatures, wherein the target temperature or temperatures may be within the desired temperature range for the temperature-sensitive materials.

For example, according to one embodiment, the present invention may be a two-PCM system. For example, a first type of passive temperature-control member may contain a first PCM, and a second type of passive temperature-control member may contain a second PCM, wherein the first and second PCMs are different types of PCMs. For example, the first PCM may be an aqueous PCM, such as water or an aqueous salt solution. The second PCM may be an organic PCM, such as, but not limited to, one or more n-alkanes. Prior to packout, the aqueous PCM may be preconditioned to a frozen state. Where the aqueous PCM is water, this may involve, for example, preconditioning the water to a solid state (i.e., ice) by placing the passive temperature-control member containing water in a freezer or other active temperature-control member that is set at a subzero temperature until the water has reached the subzero Celsius temperature. For purposes of illustration, the subzero temperature may be, but is not limited to, −20° C. Where the organic PCM is one or more n-alkanes having a solid/liquid phase-change temperature less than room temperature, the passive temperature-control member containing the organic PCM may simply be stored at room temperature prior to packout. (Alternatively, instead of being stored at room temperature, the passive temperature-control member containing the organic PCM may be stored at a temperature other than room temperature, such as, but not limited to, a temperature that is intermediate to room temperature and its solid/liquid phase-change temperature or a temperature that is above room temperature.) Then, at packout, both the passive temperature-control member containing frozen water and the passive temperature-control member containing room temperature organic PCM may be placed inside of a container and may be brought into thermal contact with one another. Preferably, the two types of passive temperature-control members are brought into close enough thermal contact with one another so that efficient heat transfer between the two types of passive temperature-control members may occur with very little heat loss. In this manner, the passive temperature-control member containing frozen water may be used to cool the passive temperature-control member containing room temperature organic PCM. The extent to which such cooling occurs depends on a number of factors, some of which are discussed below in greater detail.

As shown by Equation 1 below (Eq. 1), assuming that there is no heat loss in the heat exchange between the two types of PCMs, the heat that is lost by the room temperature organic PCM ($q_{lost}$) is equal to the heat that is gained by the frozen water PCM ($q_{gained}$).

$$q_{lost} = q_{gained} \quad \text{(Eq. 1)}$$

Moreover, assuming that, after heat exchange between the two PCMs, the organic PCM is partially solidified at its solid/liquid phase-change temperature, the amount of heat that is lost by the room temperature organic PCM is defined by Equation 2 below (Eq. 2):

$$q_{lost} = \text{heat lost by organic PCM in liquid phase} + \text{heat lost by organic PCM at phase-change temperature} \quad \text{(Eq. 2)}$$

The heat lost by the organic PCM while in its liquid phase is defined by Equation 3 below (Eq. 3):

$$\text{heat lost by organic PCM in liquid phase} = (m_{oPCM}) \times (\text{sp. ht.}_{oPCM}) \times (\Delta t_{oPCM}) \quad \text{(Eq. 3)}$$

wherein $m_{oPCM}$ is the mass of the organic PCM, sp. ht.$_{oPCM}$ is the specific heat of the organic PCM, and $\Delta t_{oPCM}$ is the change in temperature of the organic PCM before and after thermal exchange with the frozen water.

In addition, the heat lost by the organic PCM (oPCM) at its phase-change temperature is defined by Equation 4 below (Eq. 4):

$$\text{heat lost by oPCM at phase-change temperature} = \text{heat of fusion oPCM} \times \text{solidified mass of oPCM} \quad \text{(Eq. 4)}$$

Correspondingly, the amount of heat that is gained by the frozen water PCM is defined by Equation 5 below (Eq. 5):

$$q_{gained} = \text{heat gained by ice} + \text{heat gained by ice/water during phase change} + \text{heat gained by water} \quad \text{(Eq. 5)}$$

The heat gained by the water while in its solid phase is defined by Equation 6 below (Eq. 6):

$$\text{heat gained by ice} = (m_{ice}) \times (\text{sp. ht.}_{ice}) \times (\Delta t_{ice}) \quad \text{(Eq. 6)}$$

wherein $m_{ice}$ is the mass of the ice, sp. ht.$_{ice}$ is the specific heat of ice, and $\Delta t_{ice}$ is the change in temperature of the ice after thermal exchange with the organic PCM.

The heat gained during the phase change of ice to water is defined by Equation 7 below (Eq. 7):

$$\text{heat gained during phase change} = \text{heat of fusion} \times \text{mass of ice} \quad \text{(Eq. 7)}$$

Finally, the heat gained by water in its liquid phase is defined Equation 8 below (Eq. 8):

$$\text{heat gained by water} = (m_{water}) \times (\text{sp. ht.}_{water}) \times (\Delta t_{water}) \quad \text{(Eq. 8)}$$

wherein $m_{water}$ is the mass of the water, sp. ht.$_{water}$ is the specific heat of water, and $\Delta t_{water}$ is the change in temperature of the water after thermal exchange with the organic PCM.

As can be appreciated, although, in the discussion above, the organic PCM is cooled to a point where it is partially solidified at its phase-change temperature, the organic PCM may alternatively be cooled to a lesser or greater extent.

Therefore, as can be seen, by carefully selecting the type of organic PCM, the relative amounts of frozen water and organic PCM, and the initial temperatures of the frozen water and organic PCM before thermal exchange, one can use the frozen water to cool the room temperature organic PCM to a desired temperature. Typically, the desired temperature to which the room temperature organic PCM is cooled is the phase-change temperature of the organic PCM, said phase-change temperature preferably being within the target temperature range for maintaining the temperature-sensitive materials. In other words, for example, if the water is preconditioned to −20° C., if the organic PCM is n-tetradecane, if the initial temperature of the n-tetradecane is room temperature, and if one would like to cool the n-tetradecane to its solid/liquid phase-change temperature of +5° C. (e.g., for use in maintaining temperature-sensitive materials within a range of +2° C. to +8° C.), one may select appropriate relative masses of water and n-tetradecane to cause the n-tetradecane to be cooled (and, by implication, the frozen water to be heated) to the desired temperature of +5° C.

Depending on the types and the amounts of PCMs involved, as well as the respective temperatures of the PCMs at the time of packout, the heat exchange that occurs, following packout, between the preconditioned PCM and the room temperature PCM may take anywhere from up to a few minutes to 1-2 hours or more before thermal equilibrium is reached. It is believed that the thermal inertia of the payload (which is, itself, typically preconditioned, prior to packout, to a temperature within the desired temperature range) will typically be sufficient to maintain the payload until such time, following packout, that the PCMs reach thermal equilibrium.

Where, at the time of packout, the first PCM is preconditioned to a temperature below the target range for the temperature-sensitive materials, the second PCM is at room temperature, and the target temperature range for the temperature-sensitive materials is intermediate to the initial temperatures of the first and second PCMs, it may be desirable to position the second PCM between the first PCM and the payload so as to shield the payload from the very cold initial temperature of the first PCM. Moreover, in some cases, it may be desirable to split the quantity of the second PCM into two layers, with the first PCM interposed between the two layers of the second PCM. Splitting the second PCM into two layers may be beneficial as two thinner layers of the second PCM may cool faster than a single thicker layer of the second PCM. In some cases, it may be desirable that the two layers of the second PCM have equal masses. In other cases, it may be desirable that the two layers of the second PCM have unequal masses. In some cases, it may be desirable not only to have two layers of the second PCM but also to have two layers of the first PCM, perhaps with an intervening layer of insulation.

It is to be understood that, although the first PCM may be preconditioned to a temperature below the target range for the temperature-sensitive materials and the second PCM need not be preconditioned at all at the time of packout, but rather, may simply be stored at room temperature, the second PCM could be preconditioned or otherwise stored at some temperature that is above the target range and that is above or below room temperature. Also, depending on the application and the target temperature for the temperature-sensitive materials, the first PCM could be preconditioned to a temperature above the target range, and the second PCM could be at room temperature or preconditioned to another suitable temperature so that, after thermal exchange between the two PCMs following packout, the second PCM is within the target range.

Figure 2:
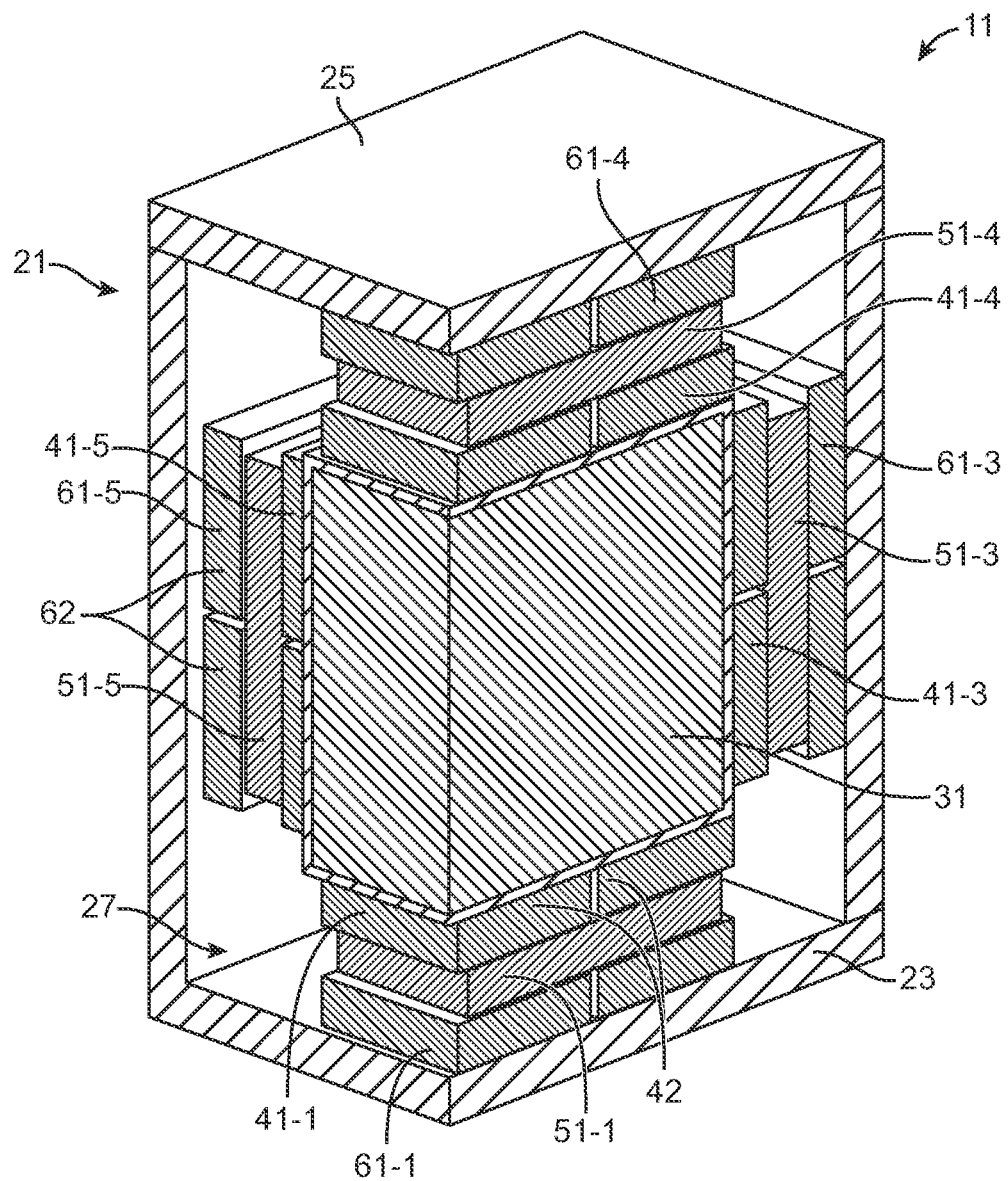
FIG. 2 is a simplified perspective view, broken away in part, of the system shown in FIG. 1, with some of the internal components along certain sides not being shown to expose other internal components.
Figure 3:
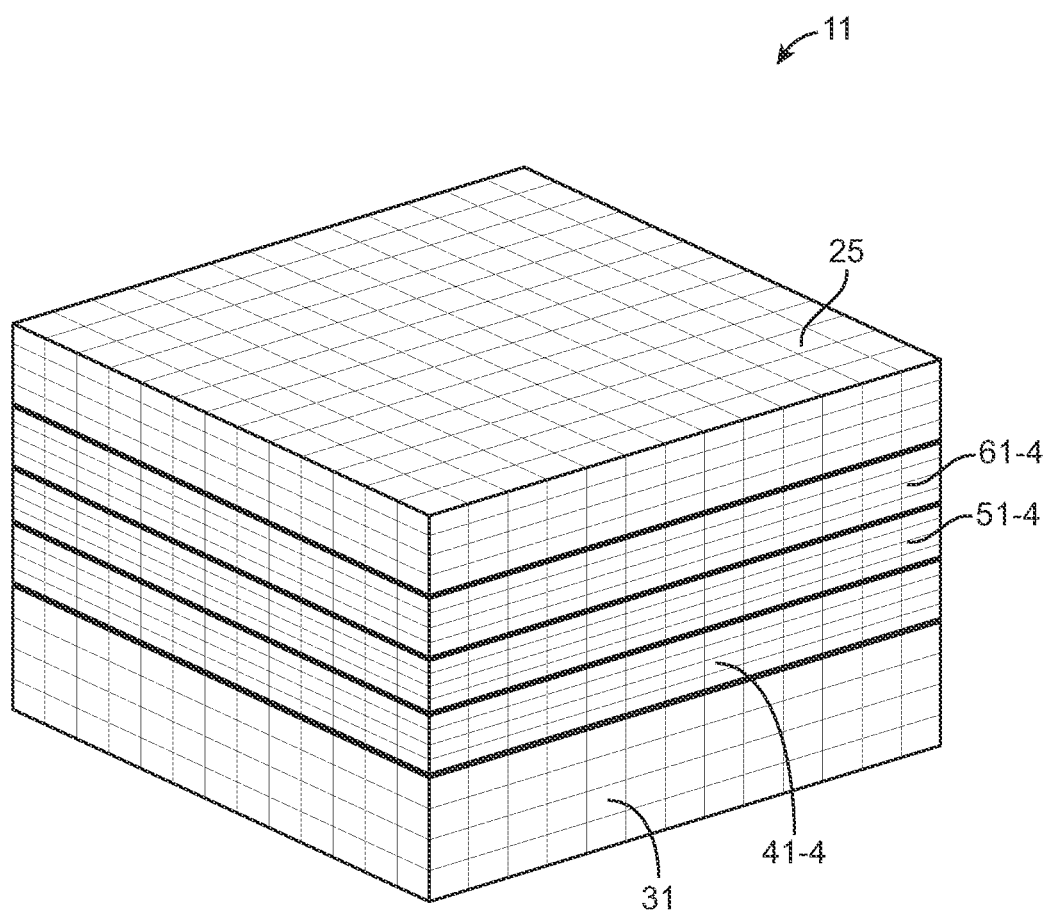
FIG. 3 is an enlarged fragmentary simplified perspective view of the system shown in FIG. 1.

Referring now to FIGS. 1 through 3, there are shown various view of a first embodiment of a system for maintaining temperature-sensitive materials within a desired temperature range for a period of time, the system being constructed according to the teachings of the present invention and being represented generally by reference numeral 11. For clarity and/or ease of illustration, certain details of system 11 that are discussed elsewhere in this application or that are not critical to an understanding of the invention may be omitted from one or more of FIGS. 1 through 3 and/or the accompanying description herein or may be shown in FIGS. 1 through 3 and/or described herein in a simplified manner.

System 11 may comprise an outer box 13. Outer box 13, which may be, for example, a conventional corrugated cardboard box or carton, may comprise a rectangular prismatic cavity 15 bounded by a plurality of rectangular side walls 17-1 through 17-4, a plurality of bottom closure flaps (not shown), and a plurality of top closure flaps 19-1 through 19-4. Adhesive strips of tape or other closure means (not shown) may be used to retain, in a closed condition, the bottom closure flaps and top closure flaps 19-1 through 19-4.

System 11 may additionally comprise an insulated container 21. Insulated container 21, which may be snugly, but removably, disposed within outer box 13, may comprise a base 23 and a cover 25. Base 23 may be shaped to include a cavity 27 for receiving one or more items of the type described below. In the present embodiment, cover 25 is shown as being removably mounted on base 23; however, it is to be understood that, alternatively, cover 25 could be hingedly connected or otherwise coupled to base 23. One or both of base 23 and cover 25 may comprise one or more thermally-insulating materials, such as, but not limited to, expanded polystyrene, foamed polyurethane, vacuum insulated panels, fiberglass, and other conventional insulating materials.

System 11 may additionally comprise a product box 31, in which the temperature-sensitive materials (not shown) may be disposed. Product box 31, which may be a conventional corrugated cardboard box or other similarly suitable container having an inner cavity (not shown), may be appropriately dimensioned to be received within cavity 27 of base 23, together with the passive temperature-control members to be discussed below.

System 11 may further comprise a first plurality of passive temperature-control members 41-1 through 41-6, a second plurality of passive temperature-control members 51-1 through 51-6, and a third plurality of passive temperature-control members 61-1 through 61-6. Temperature-control members 41-1 through 41-6, temperature-control members 51-1 through 51-6, and temperature-control members 61-1 through 61-6 may be appropriately dimensioned so that they may be positioned within cavity 27 of base 23, together with product box 31. Preferably, one of each of temperature-control members 41-1 through 41-6, temperature-control members 51-1 through 51-6, and temperature-control members 61-1 through 61-6 is dimensioned to be positioned along one of each face of product box 31, with temperature-control members 41-1 through 41-6 being positioned most proximate to product box 31, with temperature-control members 61-1 through 61-6 being positioned most distal to product box 31, and with temperature-control members 51-1 through 51-6 being positioned intermediate to temperature-control members 41-1 through 41-6 and temperature-control members 61-1 through 61-6. In the present embodiment, temperature-control members 41-1 through 41-6, temperature-control members 51-1 through 51-6, and temperature-control members 61-1 through 61-6 may be appropriately dimensioned so that they are snugly received between product box 31 and insulated container 21, with temperature-control members 41-1 through 41-6 being in direct contact with product box 31, with temperature-control members 51-1 through 51-6 being in direct contact with corresponding temperature-control members 41-1 through 41-6, and with temperature-control members 61-1 through 61-6 being in direct contact with corresponding temperature-control members 51-1 through 51-6 and with insulated container 21; however, this need not be the case as there may be air gaps or other physical structures interposed between at least some of the aforementioned items. For example, in some cases, base 23 and/or cover 25 of container 21 may be shaped to include dividers to separate some of the aforementioned items.

In the present embodiment, each of temperature-control members 41-1 through 41-6 comprises two generally rectangular, trough-shaped pouches 42 containing phase-change material, each of temperature-control members 51-1 through 51-6 comprises one generally rectangular pouch containing phase-change material, and each of temperature-control members 61-1 through 61-6 comprises two generally rectangular, trough-shaped pouches 62 containing phase-change material. However, it is to be understood that the number of temperature-control members and the number and shape of pouches in said temperature-control members are merely illustrative. Consequently, the number of temperature-control members, as well as the number and shape of pouches therein, may be varied while still coming within the scope of the present invention.

In the present embodiment, each of temperature-control members 41-1 through 41-6 may be identical to one another, each of temperature-control members 51-1 through 51-6 may be identical to one another, and each of temperature-control members 61-1 through 61-6 may be identical to one another. Moreover, in the present embodiment, temperature-control members 41-1 through 41-6 may be identical to temperature-control members 61-1 through 61-6.

More specifically, according to one embodiment, each of temperature-control members 41-1 through 41-6 and each of temperature-control members 61-1 through 61-6 may contain an organic phase-change material, and each of temperature-control members 51-1 through 51-6 may contain an aqueous phase-change material.

Materials suitable for use as temperature-control members 41-1 through 41-6 and temperature-control members 61-1 through 61-6 may be similar to, but not limited to, refrigerant packs of the type disclosed in U.S. Pat. No. 9,598,622 B2, inventors Formato et al., issued Mar. 21, 2017, and U.S. Patent Application Publication No. US 2018/0093816 A1, inventors Longley et al., published Apr. 5, 2018, both of which are incorporated herein by reference. For example, according to one embodiment, each of temperature-control members 41-1 through 41-6 and temperature-control members 61-1 through 61-6 may be in the form of a flexible pack having two sealed pouches, each of the two sealed pouches containing a gelled organic phase-change material, such as is disclosed in U.S. Pat. No. 9,598,622 B2 and U.S. Patent Application Publication No. US 2018/0093816 A1. More specifically, a suitable gelled organic phase-change material may comprise, for example, one or more n-alkanes, such as n-tetradecane (C14), n-pentadecane (C15), n-hexadecane (C16), n-heptadecane (C17), n-octadecane (C18), or combinations thereof, together with a gelling agent in the form of a styrene-ethylene-butylene-styrene triblock copolymer and/or a styrene-ethylene-propylene-styrene triblock copolymer. Solely for purposes of illustration, where, for example, system 11 is designed to keep a payload within a temperature range of 2° C. to +8° C., the gelled phase-change material may comprise a mixture of n-tetradecane (C14), n-hexadecane (C16), and KRATON™ G1654 styrene-ethylene-butylene-styrene (SEBS) tri-block copolymer, and such a gelled phase-change material may have a phase-change temperature of about 3° C. Alternatively, the gelled phase-change material may comprise a mixture of n-tetradecane (C14) and KRATON™ G1654 styrene-ethylene-butylene-styrene (SEBS) tri-block copolymer, and such a gelled phase-change material may have a phase-change temperature of about 5° C. On the other hand, where, for example, system 11 is designed to keep a payload within a temperature range of +15° C. to +25° C., the gelled phase-change material may comprise a mixture of n-hexadecane (C16) and KRATON™ G1654 styrene-ethylene-butylene-styrene (SEBS) tri-block copolymer, and such a gelled phase-change material may have a phase-change temperature of about 17° C. Each of temperature-control members 41-1 through 41-6 and temperature-control members 61-1 through 61-6 may contain suitable masses of the phase-change material and the gelling agent for the particular application to which system 11 is put. For example, each pouch may contain approximately 150-200 g of the n-alkane (s) and approximately 12-18 g of the gelling agent.

It is to be understood that the phase-change material of temperature-control members 41-1 through 41-6 and temperature-control members 61-1 through 61-6 need not comprise one or more n-alkanes and, instead, may comprise some other type of phase-change material, such as, but not limited to, fatty acid esters (e.g., methyl esters, such as lauric acid methyl ester (also known as methyl laurate) and myristic acid methyl ester (also known as methyl myristate)), fatty alcohols (e.g., decyl alcohol (also known as 1-decanol) and dodecyl alcohol (also known as 1-dodecanol)), and fatty acids (e.g., ricinoleic acid and caprylic acid). Other examples of suitable phase-change materials will be known to those of ordinary skill in the art.

Also, it is to be understood that, while, in the present embodiment, each pouch 42 of temperature-control members 41-1 through 41-6 and each pouch 62 of temperature-control members 61-1 through 61-6 contains the same quantity and type of phase-change material, this need not be so as some of temperature-control members 41-1 through 41-6 may contain different phase-change materials than others of temperature-control members 41-1 through 41-6 and/or some of temperature-control members 61-1 through 61-6 may contain different phase-change materials than others of temperature-control members 61-1 through 61-6 and/or some of temperature-control members 41-1 through 41-6 may contain different phase-change materials than some of temperature-control members 61-1 through 61-6.

Examples of aqueous phase-change materials suitable for use in temperature-control members 51-1 through 51-6 may include, but are not limited to, water and aqueous salt solutions. For example, temperature-control members 51-1 through 51-6 may be, but are not limited to, one or more of conventional ice packs, conventional aqueous gel packs, and conventional aqueous bricks. Although, in the present embodiment, each of temperature-control members 51-1 through 51-6 is identical to one another, this need not be the case. For example, the type and/or amount of aqueous phase-change material may vary. Also, it is to be understood that, although temperature-control members 51-1 through 51-6 are described above as containing an aqueous phase-change material, phase-change materials other than aqueous phase-change materials may be used.

Preferably, the types and amounts of phase-change materials used in temperature-control members 41-1 through 41-6, temperature-control members 51-1 through 51-6, and temperature-control members 61-1 through 61-6 are selected so that the phase-change material of temperature-control members 51-1 through 51-6, after being appropriately preconditioned, may be used to cool the phase-change material of temperature-control members 41-1 through 41-6 and temperature-control members 61-1 through 61-6 to its phase-change temperature, which is preferably within the target temperature range for the temperature-sensitive materials.

In other words, for example, if the phase-change material of each of temperature-control members 41-1 through 41-6 and each of temperature-control members 61-1 through 61-6 is n-tetradecane, if the phase-change material of each of temperature-control members 51-1 through 51-6 is water, if temperature-control members 51-1 through 51-6 are preconditioned at −20° C., and if temperature-control members 41-1 through 41-6 and temperature-control members 61-1 through 61-6 are at room temperature prior to packout, one would preferably tailor temperature-control members 51-1 through 51-6 so that the total mass of water contained therein is such that the total mass of n-tetradecane in temperature-control members 41-1 through 41-6 and temperature-control members 61-1 through 61-6 is cooled to its solid/liquid phase-change temperature of +5° C. after reaching thermal equilibrium with the water following packout.

Figure 4:
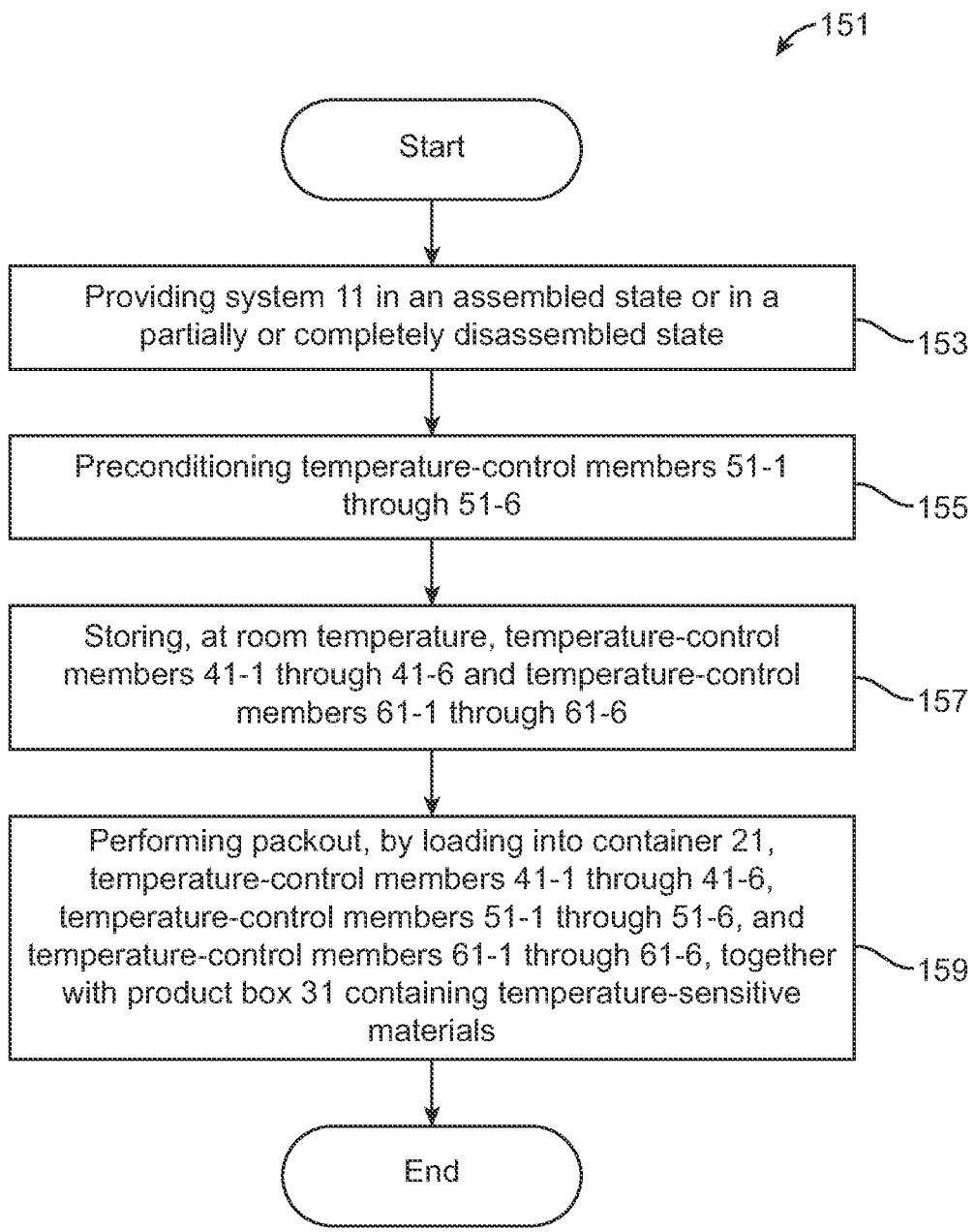
FIG. 4 is a flowchart depicting one embodiment of a method according to the present invention by which one may use the system of FIG. 1.

Referring now to FIG. 4, there is shown a flowchart depicting a first embodiment of a method according to the present invention by which system 11 may be used, the method being identified generally by reference numeral 151. For simplicity, certain details of method 151 that are not critical to an understanding of the invention may be omitted from FIG. 4 and/or the accompanying description herein or may be shown in FIG. 4 and/or described herein in a simplified manner.

Method 151 may comprise a step 153. Step 153 may comprise providing system 11, either in an assembled state or in a partially or completely disassembled state. For example, prior to use, system 11 may be stored in a completely assembled state, with container 21 positioned within outer box 13 and with product box 31, temperature-control members 41-1 through 41-6, temperature-control members 51-1 through 51-6, and temperature-control members 61-1 through 61-6 disposed within container 21. Alternatively, some of the components of system 11 may be stored separately from other of the components of system 11. For example, some or all of the various temperature-control members may be stored and/or transported separately from container 21 and may first become associated with container 21 only during packout. Such handling may permit large quantities of such temperature-control members to be transported, stored and/or preconditioned more efficiently.

Method 151 may also comprise a step 155. Step 155 may comprise preconditioning temperature-control members 51-1 through 51-6. If temperature-control members 51-1 through 51-6 are stored within container 21, temperature-control members 51-1 through 51-6 are preferably removed from container 21 and then preconditioned. Where, for example, temperature-control members 51-1 through 51-6 comprise water, such preconditioning may comprise storing temperature-control members 51-1 through 51-6 in a freezer or other preconditioning unit until the water has reached a suitable preconditioning temperature (e.g., −20° C.).

Method 151 may additionally comprise a step 157. Step 157 may comprise storing temperature-control members 41-1 through 41-6 and temperature-control members 61-1 through 61-6 at room temperature (or at some other initial temperature preferably above its solid/liquid phase-change temperature). Such storing at room temperature preferably takes place in a temperature-controlled space so that the amount of cooling experienced by temperature-control members 41-1 through 41-6 and temperature-control members 61-1 through 61-6, when exposed to temperature-control members 51-1 through 51-6, may be carefully regulated.

Method 151 may further comprise a step 159. Step 159, which is preferably performed subsequent to steps 153, 155 and 157, may comprise performing packout. More specifically, step 159 may comprise loading into container 21 the following: (1) temperature-control members 41-1 through 41-6, which preferably are room-temperature, (2) temperature-control members 51-1 through 51-6, which preferably have been preconditioned to a frozen state (e.g., −20° C.), (3) temperature-control members 61-1 through 61-6, which preferably are room-temperature, and (4) product box 31 containing a payload of one or more temperature-sensitive materials, which preferably have been preconditioned to within the desired or target temperature range (e.g., +2° C. to +8° C.). (The one or more temperature-sensitive materials may, themselves, be packaged into one or more individual containers inside of product box 31 but need not be.) Preferably, the loading of temperature-control members 41-1 through 41-6, 51-1 through 51-6, and 61-1 through 61-6 and the loading of product box 31 and its payload are performed substantially concurrently with one another, i.e., the various temperature-control members and the payload are loaded into container 21 before substantial thermal transfer occurs. For example, where it takes 1-2 hours for thermal equilibrium to be reached, the various temperature-control members and the payload are preferably loaded within a period of a few minutes. Step 159 may also comprise closing container 21 once the foregoing items have been placed thereinto. The one or more temperature-sensitive materials may then be maintained within their desired or target temperature range for an extended period of time by system 11. During this extended period of time, system 11, together with the one or more temperature-sensitive materials contained therewithin, may be shipped from one location to another and/or may remain stationary for some period time.

Without wishing to be limited to any particular theory behind the invention, it is believed that, initially, the one or more temperature-sensitive materials may be maintained within their desired or target temperature range primarily by their own thermal inertia, augmented by the thermal insulation provided by system 11. (As noted above, prior to being loaded into system 11, the one or more temperature-sensitive materials preferably are maintained within their desired or target temperature range.) Then, soon after packout (i.e., a few minutes to 1-2 hours or longer), the phase-change material of temperature-control members 41-1 through 41-6 and of temperature-control members 61-1 through 61-6 is cooled to a temperature that is at its solid/liquid phase-change temperature. (The aforementioned sold/liquid phase-change temperature is preferably within the desired or target temperature range of the one or more temperature-sensitive materials to be maintained by system 11.) Preferably, this cooling occurs while the one or more temperature-sensitive materials are still within their desired or target temperature range. Thereafter, continued maintenance of the one or more temperature-sensitive materials within their desired or target temperature range is provided primarily by the various PCMs and insulation of system 11.

It is to be understood that, although method 151 is described above as having a plurality of steps, such steps need not be performed in the sequence set forth above, except to the extent explicitly set forth above and/or to the extent logically required.

One advantage of method 151, as compared to the method of U.S. Pat. No. 9,581,374, is that, whereas the method of U.S. Pat. No. 9,581,374 requires that the latent heat storage elements be preconditioned by the crushed ice prior to packout, method 151 does not require any preconditioning, prior to packout, of the phase-change material of passive temperature-control members 41-1 through 41-6 and of passive temperature-control members 61-1 through 61-6. Instead, according to method 151, one may simply load the various phase-change materials into container 21, together with a payload, and allow thermal conditioning of passive temperature-control members 41-1 through 41-6 and passive temperature-control members 61-1 through 61-6, to occur after packout. In this sense, system 11 may be regarded as being "self-conditioning" since, after packout and during such time that system 11 is being used to maintain the temperature-sensitive materials within a desired temperature range, some of the passive temperature-control members of the system (namely, passive temperature-control members 51-1 through 51-6) are being used to condition the remaining passive temperature-control members of the system (namely, passive temperature-control members 41-1 through 41-6 and passive temperature-control members 61-1 through 61-6). This is in contrast with the system of U.S. Pat. No. 9,581,374, in which all of the passive temperature-control members used to maintain the temperature-sensitive materials are preconditioned prior to packout.

As such, method 151 is considerably more efficient and simpler than loading first and second phase-change materials in a container, waiting (perhaps for one or more hours) for the first phase-change material to precondition the second phase-change material, periodically checking the second phase-change material to see if it has reached its target temperature, and then, once the target temperature for the second phase-change material has been reached, removing the first phase-change material from the container and loading the payload into the container. Notwithstanding the above, system 11 could alternatively be used in a manner in which thermal exchange takes place between the phase-change materials in the container before the payload is loaded into the container.

Figure 5A:
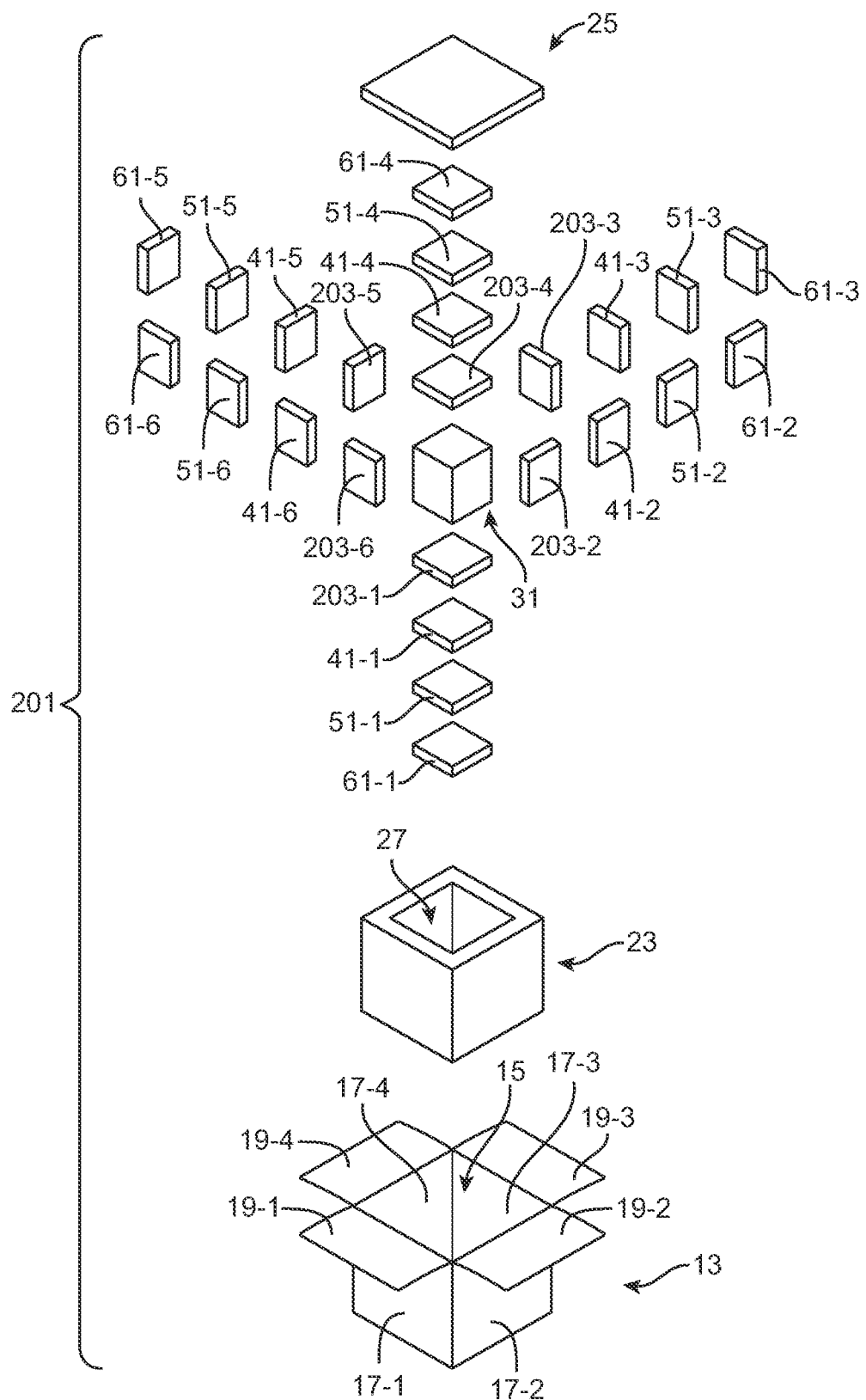
FIGS. 5(a) and 5(b) are exploded perspective and enlarged fragmentary simplified section views, respectively, of a second embodiment of a system for maintaining temperature-sensitive materials within a desired temperature range for a period of time, the system being constructed according to the teachings of the present invention.
Figure 5B:
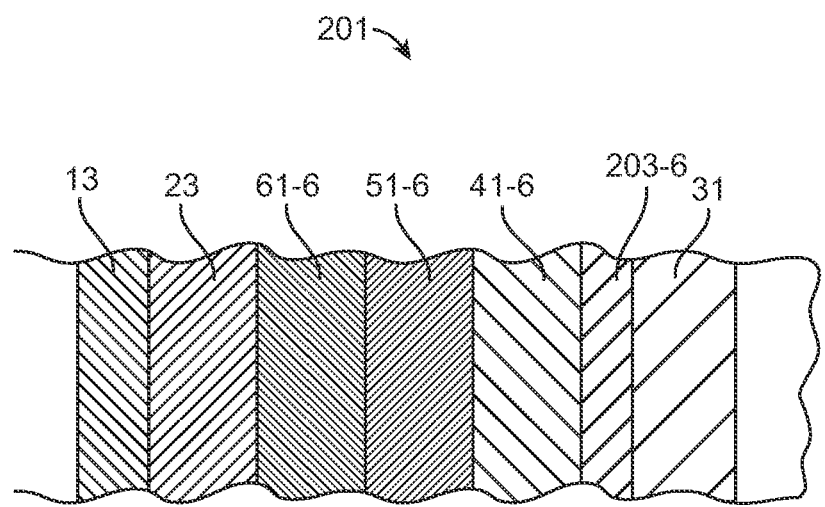

Referring now to FIGS. 5(a) and 5(b), there are shown exploded perspective and enlarged fragmentary simplified section views, respectively, of a second embodiment of a system for maintaining temperature-sensitive materials within a desired temperature range for a period of time, the system being constructed according to the teachings of the present invention and represented generally by reference numeral 201. For clarity and/or ease of illustration, certain details of system 201 that are discussed elsewhere in this application or that are not critical to an understanding of the invention may be omitted from FIGS. 5(a) and 5(b) and/or the accompanying description herein or may be shown in FIGS. 5(a) and 5(b) and/or described herein in a simplified manner.

System 201 may be similar in many respects to system 11. One difference between system 201 and system 11 may be that system 201 may further comprise a plurality of insulation members 203-1 through 203-6 interposed between product box 31 and one or more of temperature-control members 41-1 through 41-6. Insulation members 203-1 through 203-6 may serve to protect thermally the one or more temperature-sensitive materials within product box 31 if one or more of temperature-control members 41-1 through 41-6 are temporarily too warm or too cold. Insulation members 203-1 through 203-6 may comprise one or more thermally insulating materials including, but not limited to, expanded polystyrene, foamed polyurethane, vacuum insulated panels, fiberglass, and other conventional insulating materials. Although insulation members 203-1 through 203-6 are shown in the present embodiment as being disposed on all faces of product box 31, one or more of insulation members 203-1 through 203-6 may be omitted. Insulation members 203-1 through 203-6 may be fixedly secured to product box 31 or may simply be positioned against or near product box 31.

System 201 may be used analogously to system 11. Therefore, for example, but not limited thereto, system 201 may be used according to method 151.

Figure 6A:
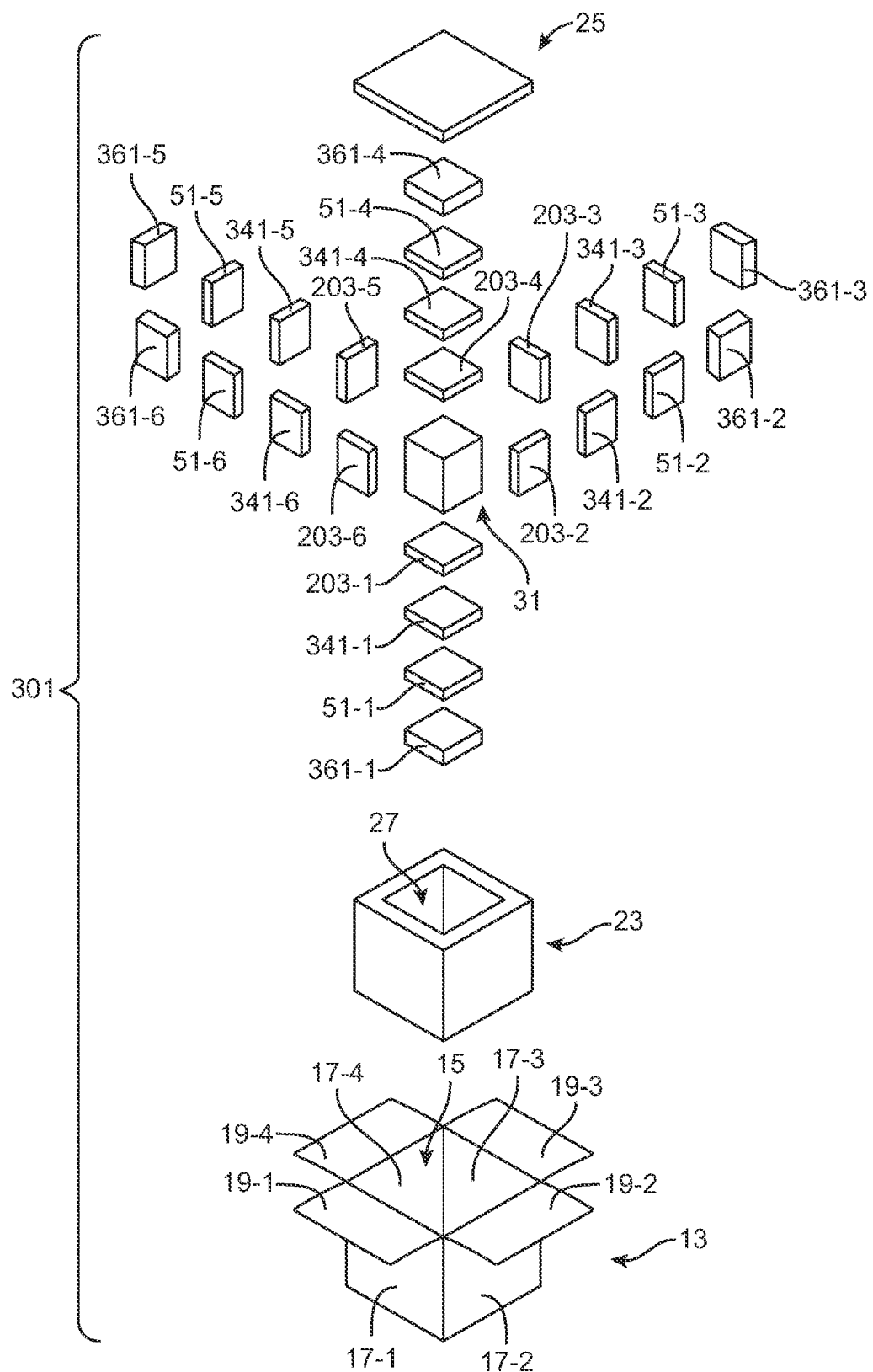
FIGS. 6(a) and 6(b) are exploded perspective and enlarged fragmentary simplified section views, respectively, of a third embodiment of a system for maintaining temperature-sensitive materials within a desired temperature range for a period of time, the system being constructed according to the teachings of the present invention.
Figure 6B:
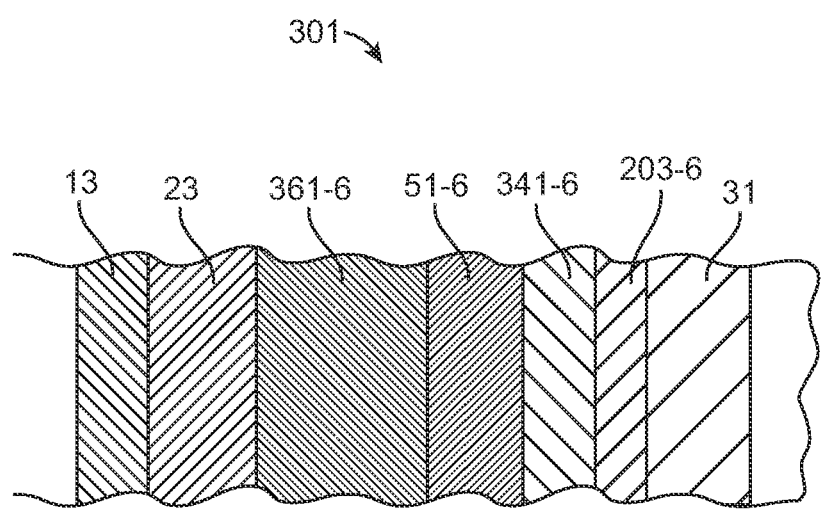

Referring now to FIGS. 6(a) and 6(b), there are shown exploded perspective and enlarged fragmentary simplified section views, respectively, of a third embodiment of a system for maintaining temperature-sensitive materials within a desired temperature range for a period of time, the system being constructed according to the teachings of the present invention and represented generally by reference numeral 301. For clarity and/or ease of illustration, certain details of system 301 that are discussed elsewhere in this application or that are not critical to an understanding of the invention may be omitted from one or both of FIGS. 6(a) and 6(b) and/or the accompanying description herein or may be shown in one or both of FIGS. 6(a) and 6(b) and/or described herein in a simplified manner.

System 301 may be similar in many respects to system 201. One difference between system 201 and system 301 may be that, whereas system 201 may comprise temperature-control members 41-1 through 41-6 and temperature-control members 61-1 through 61-6, all of which may have the same type of PCM and the same amount of PCM, system 301 may comprise temperature-control members 341-1 through 341-6 and temperature-control members 361-1 through 361-6, all of which may have the same type of PCM but with a first amount of lesser mass being found in each of temperature-control members 341-1 through 341-6 and with a second amount of greater mass being found in each of temperature-control members 361-1 through 361-6. (All of temperature-control members 341-1 through 341-6 and 361-1 through 361-6 may be at room temperature prior to packout.) In other words, whereas the cumulative amount of phase-change material in temperature-control members 341-1 through 341-6 and temperature-control members 361-1 through 361-6 of system 301 may be equal to the cumulative amount of phase-change material in temperature-control members 41-1 through 41-6 and temperature-control members 61-1 through 61-6 of system 201, the distribution of phase-change material between the inner and outer layers of phase-change material is different in system 301 than in system 201, with system 301 providing less phase-change material in the inner layer and providing more phase-change material in the outer layer and with system 201 providing even amounts of the phase-change material in the inner and outer layers. One advantage to providing less phase-change material in the inner layer and more phase-change material in the outer layer, as provided for in system 301, is that the inner layer of phase-change material will tend to cool down faster. This may be desirable where the inner layer would otherwise cool too slowly, allowing the payload temperature to rise above its desired temperature range.

It is to be understood that, although system 301 is shown in the present embodiment as including insulation members 203-1 through 203-6, one or more of insulation members 203-1 through 203-6 may be omitted.

System 301 may be used analogously to system 11. Therefore, for example, but not limited thereto, system 301 may be used according to method 151.

Figure 7A:
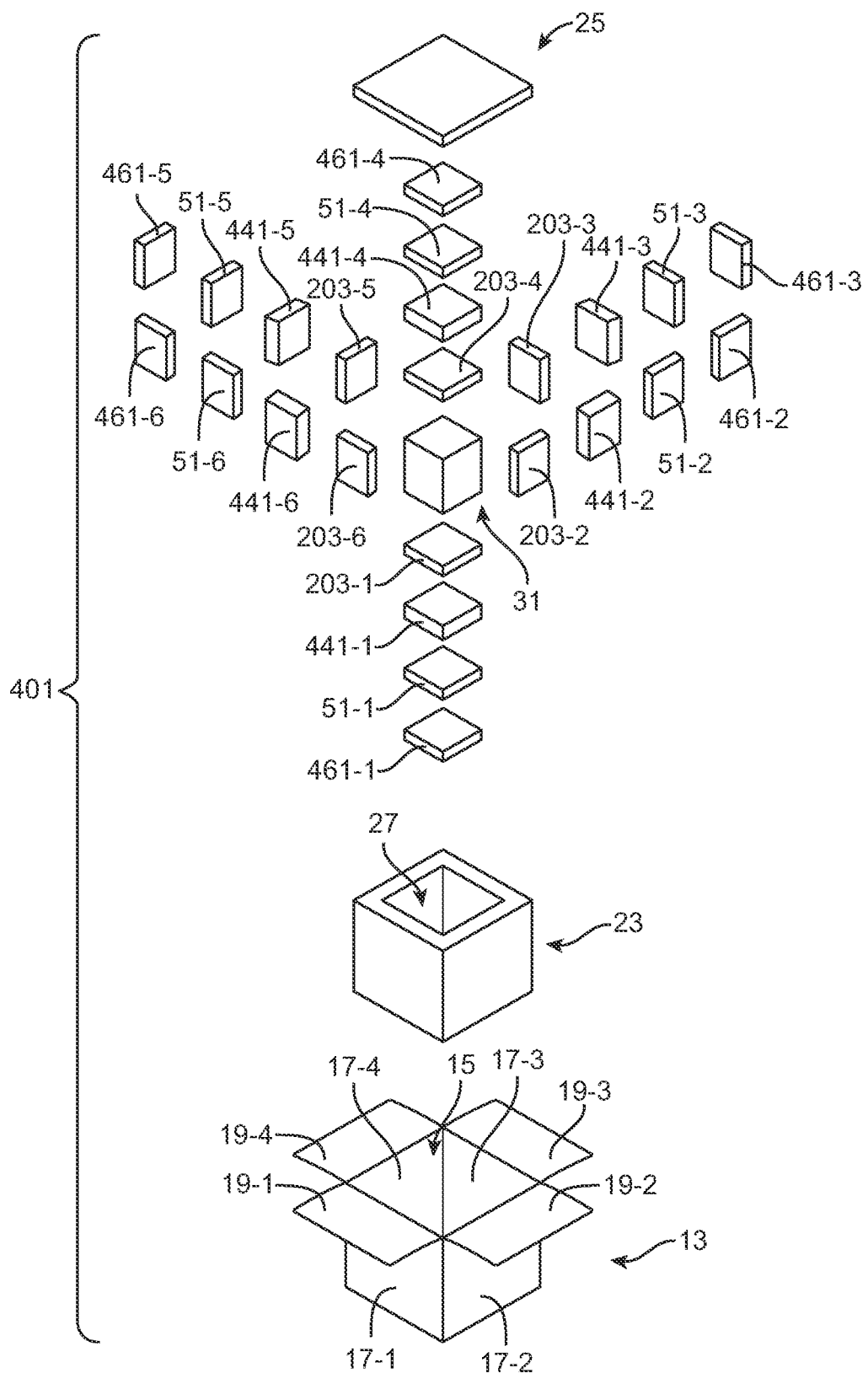
FIGS. 7(a) and 7(b) are exploded perspective and enlarged fragmentary simplified section views, respectively, of a fourth embodiment of a system for maintaining temperature-sensitive materials within a desired temperature range for a period of time, the system being constructed according to the teachings of the present invention.
Figure 7B:
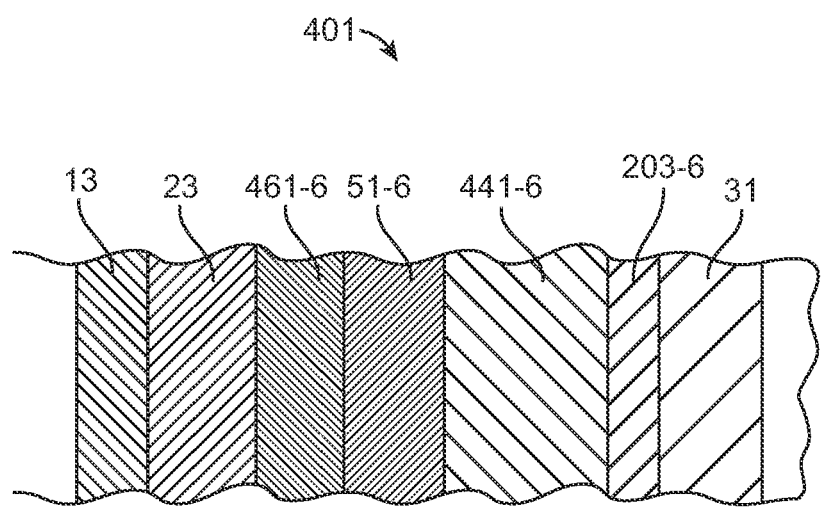

Referring now to FIGS. 7(*a*) and 7(*b*), there are shown exploded perspective and enlarged fragmentary simplified section views, respectively, of a fourth embodiment of a system for maintaining temperature-sensitive materials within a desired temperature range for a period of time, the system being constructed according to the teachings of the present invention and represented generally by reference numeral 401. For clarity and/or ease of illustration, certain details of system 401 that are discussed elsewhere in this application or that are not critical to an understanding of the invention may be omitted from one or both of FIGS. 7(*a*) and 7(*b*) and/or the accompanying description herein or may be shown in one or both of FIGS. 7(*a*) and 7(*b*) and/or described herein in a simplified manner.

System 401 may be similar in many respects to system 201. One difference between system 201 and system 401 may be that, whereas system 201 may comprise temperature-control members 41-1 through 41-6 and temperature-control members 61-1 through 61-6, all of which may have the same type of PCM and the same amount of PCM, system 401 may comprise temperature-control members 441-1 through 441-6 and temperature-control members 461-1 through 461-6, all of which may have the same type of PCM but with a first amount of greater mass being found in each of temperature-control members 441-1 through 441-6 and with a second amount of lesser mass being found in each of temperature-control members 461-1 through 461-6. (All of temperature-control members 441-1 through 441-6 and 461-1 through 461-6 may be at room temperature prior to packout.) In other words, whereas the cumulative amount of phase-change material in temperature-control members 441-1 through 441-6 and temperature-control members 461-1 through 461-6 of system 401 may be equal to the cumulative amount of phase-change material in temperature-control members 41-1 through 41-6 and temperature-control members 61-1 through 61-6 of system 201, the distribution of phase-change material between the inner and outer layers of phase-change material is different in system 401 than in system 201, with system 401 providing more phase-change material in the inner layer and providing less phase-change material in the outer layer and with system 201 providing even amounts of the phase-change material in the inner and outer layers. One advantage to providing more phase-change material in the inner layer and less phase-change material in the outer layer, as provided for in system 401, is that the inner layer of phase-change material will tend to cool down slower. This may be desirable where the inner layer would otherwise cool too quickly, causing the payload temperature to sink below its desired temperature range.

As can readily be appreciated, systems 301 and 401 may be regarded as complementary or mirror-image systems.

It is to be understood that, although system 401 is shown in the present embodiment as including insulation members 203-1 through 203-6, one or more of insulation members 203-1 through 203-6 may be omitted.

System 401 may be used analogously to system 11. Therefore, for example, but not limited thereto, system 401 may be used according to method 151.

Figure 8A:
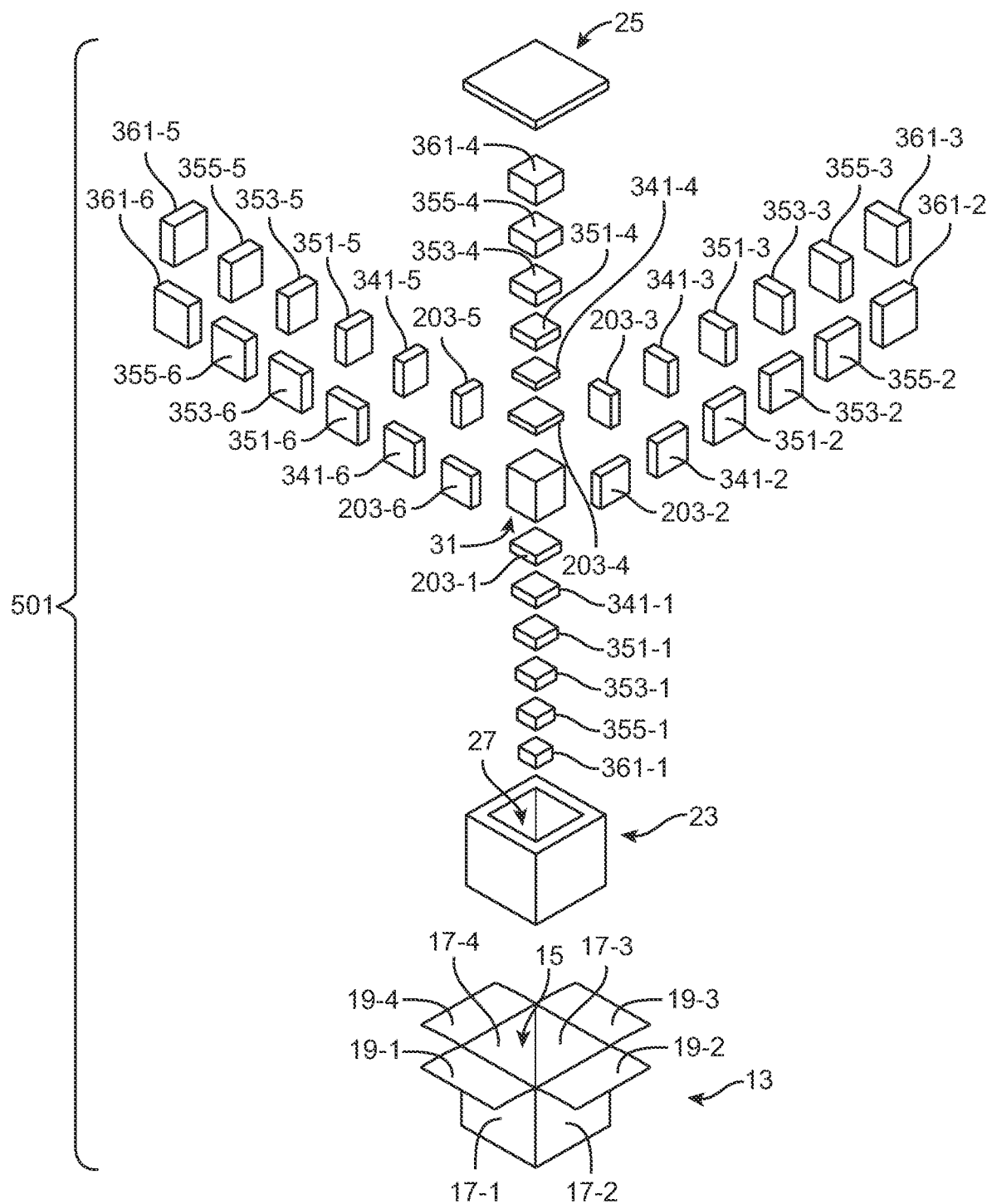
FIGS. 8(a) and 8(b) are exploded perspective and enlarged fragmentary simplified section views, respectively, of a fifth embodiment of a system for maintaining temperature-sensitive materials within a desired temperature range for a period of time, the system being constructed according to the teachings of the present invention.
Figure 8B:
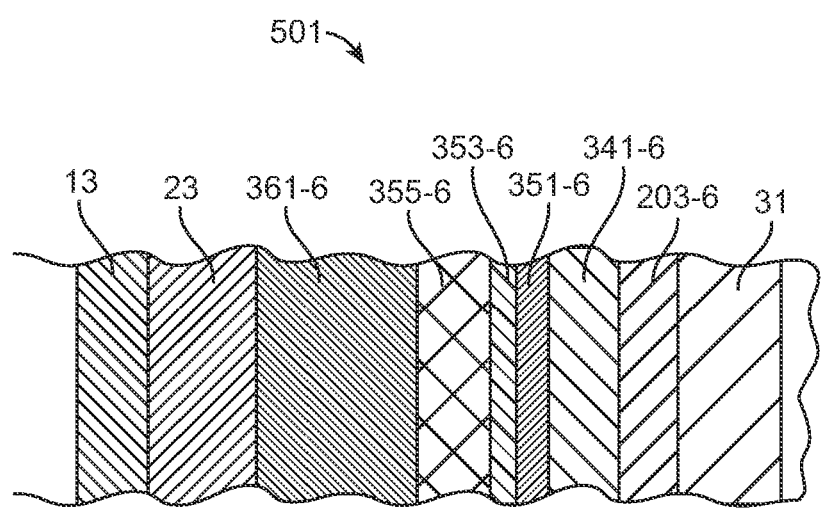

Referring now to FIGS. 8(*a*) and 8(*b*), there are shown exploded perspective and enlarged fragmentary simplified section views, respectively, of a fifth embodiment of a system for maintaining temperature-sensitive materials within a desired temperature range for a period of time, the system being constructed according to the teachings of the present invention and represented generally by reference numeral 501. For clarity and/or ease of illustration, certain details of system 501 that are discussed elsewhere in this application or that are not critical to an understanding of the invention may be omitted from one or both of FIGS. 8(*a*) and 8(*b*) and/or the accompanying description herein or may be shown in one or both of FIGS. 8(*a*) and 8(*b*) and/or described herein in a simplified manner.

System 501 may be similar in many respects to system 301. One difference between the two systems may be that, whereas system 301 may comprise temperature-control members 51-1 through 51-6, system 501 may comprise instead the combination of temperature-control members 351-1 through 351-6, insulation layers 353-1 through 353-6, and temperature-control members 355-1 through 355-6. Like temperature-control members 51-1 through 51-6 of system 301, temperature-control members 351-1 through 351-6 and temperature-control members 355-1 through 355-6 may have water as the phase-change material and may be preconditioned to a frozen state (e.g., −20° C.), and the cumulative amount of water in temperature-control members 351-1 through 351-6 and temperature-control members 355-1 through 355-6 may equal the cumulative amount of water in temperature-control members 51-1 through 51-6. However, the distribution of water in these two layers of temperature-control members may be uneven, with temperature-control members 351-1 through 351-6 having a lesser amount of water and with temperature-control members 355-1 through 355-6 having a greater amount of water. Preferably, the amount of water in temperature-control members 351-1 through 351-6 is appropriately selected so that, at thermal equilibrium, the phase-change material of temperature-control members 341-1 through 341-6 is cooled to its solid/liquid phase-change temperature, and the amount of water in temperature-control members 355-1 through 355-6 is appropriately selected so that, at thermal equilibrium, the phase-change material of temperature-control members 361-1 through 361-6 is cooled to its solid/liquid phase-change temperature. Insulation layers 353-1 through 353-6, which may comprise one or more thermally insulating materials including, but not limited to, expanded polystyrene, foamed polyurethane, vacuum insulated panels, fiberglass, and other conventional insulating materials, may serve to thermally isolate, to some extent, the two groups of water/organic PCMs from one another.

System 501 is designed so that the thinner temperature-control members 341-1 through 341-6 may cool more quickly whereas the thicker temperature-control members 361-1 through 361-6 and temperature-control members 355-1 through 355-6 provide more thermal endurance.

It is to be understood that, although system 501 is shown in the present embodiment as including insulation members 203-1 through 203-6, one or more of insulation members 203-1 through 203-6 may be omitted.

System 501 may be used analogously to system 11. Therefore, for example, but not limited thereto, system 501 may be used according to method 151.

As can be appreciated, one advantage of the present invention, as compared to prior approaches utilizing two or more different types of PCMs, is that the present invention does not require the use of more than one type of preconditioning unit and permits the loading of room-temperature PCM into a container, together with a payload, at the time of packout.

Another advantage of the present invention is that the present invention is better able to condition an organic PCM to a partly frozen state.

It is to be understood that, although the present invention is primarily described above in the context of a system containing two types of PCMs, the present invention is not limited to a 2-PCM system and could comprise three or more different types of PCMs. For example, according to one embodiment, temperature-control members 41-1 through 41-6 could comprise a first type of PCM, temperature-control members 51-1 through 51-6 could comprise a second type of PCM, and temperature-control members 61-1 through 61-6 could comprise a third type of PCM. More specifically, the first type of PCM could have a solid/liquid phase-change temperature that is at or near the lower end of a desired temperature range for the thermally-sensitive materials, the third type of PCM could have a solid/liquid phase-change temperature that is at or near the upper end of a desired temperature range for the thermally-sensitive materials, and the second type of PCM could be ice/water or some other material used to cool the first and third types of PCMs to their respective solid/liquid phase-change temperatures. Moreover, the first and third types of PCMs need not preconditioned to within a target temperature range for the payload and, instead, could be at room temperature at the time of packout. In another embodiment, the different types of PCMs could be distributed within one or more of the three layers of temperature-control members. For example, some of temperature-control members 41-1 through 41-6 (and/or some of temperature-control members 61-1 through 61-6) could comprise the first type of PCM, and others of temperature-control members 41-1 through 41-6 (and/or some of temperature-control members 61-1 through 61-6) could comprise the third type of PCM. Alternatively, one pouch of at least some of temperature-control members 41-1 through 41-6 (and/or temperature-control members 61-1 through 61-6) could comprise the first PCM and the other pouch of at least some of temperature-control members 41-1 through 41-6 (and/or temperature-control members 61-1 through 61-6) could comprise the third PCM. Again, the first and third types of PCMs need not preconditioned to within a target temperature range for the payload and, instead, could be at room temperature at the time of packout.

Also, it is to be understood that, although the various temperature-control members and the conditions at which such temperature-control members are kept before packout may be selected so that a first type of PCM cools a second type of PCM to its solid/liquid phase-change temperature upon thermal equilibrium being reached, there may be situations in which it may be desirable, at thermal equilibrium, for the second type of PCM to be cooled to a temperature that is above or below its solid/liquid phase-change temperature. One way in which this may be achieved is to alter the relative amounts of the two types of PCMs. For example, increasing the mass ratio of the second PCM to the first PCM will cause the second PCM to be cooled less than it otherwise would be whereas decreasing the mass ratio of the second PCM to the first PCM will cause the second PCM to be cooled more than it otherwise would be.

Additionally, it is to be understood that, although water or an aqueous salt solution is described herein as an exemplary material for cooling the phase-change material whose solid/liquid phase-change temperature lies within the desired temperature range, materials other than water or an aqueous salt solution may be used for this purpose. For example and without limitation, one or more non-aqueous materials (e.g., organic and/or inorganic materials) capable of performing heat exchange may be used.

Also, depending on the desired temperature range for the temperature-sensitive materials, it may be desirable for a first PCM to be preconditioned to heat a second PCM to the desired temperature range.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A method for maintaining one or more temperature-sensitive materials within a target temperature range for a period of time, the method comprising:
    (a) providing an insulated container, a first phase-change material, and a second phase-change material, wherein the first and second phase-change materials differ from one another in chemical composition, the first phase-change material comprising an aqueous phase-change material, the second phase-change material comprising an organic phase-change material, wherein the first phase-change material has a mass, and wherein the second phase-change material has a mass;
    (b) preconditioning the first phase-change material to a preconditioning temperature below the target temperature range;
    (c) storing the second phase-change material at a temperature above the target temperature range;
    (d) then, loading the first phase-change material and the second phase-change material into the insulated container so as to permit heat exchange to occur between the first and second phase-change materials with minimal heat loss, wherein the masses of the first and second phase-change materials are selected so that, at thermal equilibrium between the first and second phase-change materials, the first and second phase-change materials are within the target temperature range; and (e) loading one or more temperature-sensitive materials into the insulated container;

(f) wherein step (e) is performed before the second phase-change material has cooled to within the target temperature range.

2. The method as claimed in claim 1 wherein the second phase-change material has a phase-change temperature within the target temperature range and wherein, at thermal equilibrium between the first and second phase-change materials, the second phase-change material is at said phase-change temperature.

3. The method as claimed in claim 1 wherein the first phase-change material is water.

4. The method as claimed in claim 3 wherein the second phase-change material comprises at least one n-alkane.

5. The method as claimed in claim 1 wherein the one or more temperature-sensitive materials are loaded into the insulated container substantially concurrently with the loading of the first and second phase-change materials into the insulated container.

6. The method as claimed in claim 1 wherein the target temperature range is +2° C. to +8° C., wherein the second phase-change material has a solid/liquid phase-change temperature within the target temperature range, and wherein, at thermal equilibrium between the first and second phase-change materials, the second phase-change material is at said solid/liquid phase-change temperature.

7. A method for maintaining one or more temperature-sensitive materials within a target temperature range for a period of time, the method comprising:

(a) providing an insulated container, a first phase-change material, and a second phase-change material, wherein the first and second phase-change materials differ from one another in chemical composition, wherein the first phase-change material is water, wherein the first phase-change material has a mass, and wherein the second phase-change material has a mass;

(b) preconditioning the first phase-change material to a preconditioning temperature below the target temperature range, wherein the preconditioning step comprises preconditioning the first phase-change material to a temperature of −20° C.;

(c) storing the second phase-change material at a temperature above the target temperature range;

(d) then, loading the first phase-change material and the second phase-change material into the insulated container so as to permit heat exchange to occur between the first and second phase-change materials with minimal heat loss, wherein the masses of the first and second phase-change materials are selected so that, at thermal equilibrium between the first and second phase-change materials, the first and second phase-change materials are within the target temperature range; and (e) loading one or more temperature-sensitive materials into the insulated container;

(f) wherein step (e) is performed before the second phase-change material has cooled to within the target temperature range.

8. The method as claimed in claim 7 wherein the second phase-change material is a liquid at room temperature and wherein the storing step comprises storing the second phase-change material at room temperature.

9. A method for maintaining one or more temperature-sensitive materials within a target temperature range for a period of time, the method comprising:

(a) providing an insulated container, a first phase-change material, and a second phase-change material, wherein the first and second phase-change materials differ from one another in chemical composition, wherein the first phase-change material has a mass, wherein the second phase-change material has a mass, wherein the second phase-change material is split into two volumes and wherein the first phase-change material is located between the two volumes of the second phase-change material;

(b) preconditioning the first phase-change material to a preconditioning temperature below the target temperature range;

(c) storing the second phase-change material at a temperature above the target temperature range;

(d) then, loading the first phase-change material and the second phase-change material into the insulated container so as to permit heat exchange to occur between the first and second phase-change materials with minimal heat loss, wherein the masses of the first and second phase-change materials are selected so that, at thermal equilibrium between the first and second phase-change materials, the first and second phase-change materials are within the target temperature range; and (e) loading one or more temperature-sensitive materials into the insulated container;

(f) wherein step (e) is performed before the second phase-change material has cooled to within the target temperature range.

10. The method as claimed in claim 9 wherein the two volumes of the second phase-change material are equal in mass.

11. The method as claimed in claim 9 wherein the two volumes of the second phase-change material are unequal in mass.

12. The method as claimed in claim 9 wherein the first phase-change material is split into two volumes separated by an insulating material.

13. The method as claimed in claim 12 wherein the two volumes of the first phase-change material are unequal in mass.

14. A system for use in maintaining one or more temperature-sensitive materials within a target temperature range for a period of time, the system comprising:

(a) an insulated container, the insulated container comprising a cavity;

(b) a product box for holding a payload, the product box being positioned within the cavity;

(c) a first passive temperature-control member positioned within the cavity, the first passive temperature-control member comprising a first phase-change material, the first phase-change material having a mass and being thermally preconditioned to a first temperature, the first temperature being below the target temperature range;

(d) a second passive temperature-control member positioned within the cavity, the second passive temperature-control member comprising a second phase-change material, the second phase-change material being different in chemical composition from the first phase-change material, the second phase-change material having a mass and being at a second temperature, the second temperature being above the target temperature range; and (e) a third passive temperature-control member positioned within the cavity, the third passive temperature-control member comprising a third phase-change material, the third phase-change material being different in chemical composition from the first phase-change material, the third phase-change material having a mass and being at a third temperature, the third temperature being above the target temperature range;

(f) wherein the masses of the first, second and third phase-change materials are selected so that, at thermal equilibrium between the first, second, and third phase-change materials, the first, second, and third phase-change materials are within the target temperature range.

15. The system as claimed in claim 14 wherein the second and third phase-change materials are identical in chemical composition.

16. The system as claimed in claim 15 wherein the second and third phase-change materials have a phase-change temperature within the target temperature range.

17. The system as claimed in claim 15 wherein the second and third phase-change materials are identical in mass.

18. The system as claimed in claim 15 wherein the second and third phase-change materials differ in mass.

19. The system as claimed in claim 14 wherein the insulated container comprises at least a first wall, wherein the product box comprises at least a first face, wherein each of the first passive temperature-control member, the second passive temperature-control member, and the third passive temperature-control member is positioned between the first face and the first wall, and wherein the first passive temperature-control member is positioned between the second passive temperature-control member and the third passive temperature-control member.

20. The system as claimed in claim 14 wherein the second and third phase-change materials differ in chemical composition.

21. The system as claimed in claim 20 wherein the second phase-change material has a phase-change temperature at a lower end of the target temperature range and wherein the third phase-change material has a phase-change temperature at an upper end of the target temperature range.

22. The system as claimed in claim 14 further comprising a payload, the payload being positioned within the product box.

23. A system for use in maintaining one or more temperature-sensitive materials within a target temperature range for a period of time, the system comprising:

(a) an insulated container, the insulated container comprising a cavity;

(b) a product box, the product box being disposed within the cavity of the insulated container, the product box being constructed to hold one or more temperature-sensitive materials;

(c) a first phase-change material disposed within the cavity of the insulated container, the first phase-change material having a mass and being thermally preconditioned to a first temperature, the first temperature being below the target temperature range;

(d) a second phase-change material disposed within the cavity of the insulated container, the second phase-change material having a mass and being different in chemical composition than the first phase-change material, the second phase-change material being at a second temperature, the second temperature being above the target temperature range; and (e) a third phase-change material disposed within the cavity of the insulated container, the third phase-change material being different in chemical composition from the first phase-change material and identical in chemical composition to the second phase-change material, the third phase-change material having a mass and being at a third temperature, the third temperature being identical to the second temperature;

(f) wherein the second phase-change material is more proximal to the product box, wherein the third phase-change material is more distal to the product box, wherein the first phase-change material is disposed between the first third and second phase-change materials, and wherein the masses of the first, second and third phase-change materials are selected so that, at thermal equilibrium between the first, second and third phase-change materials, the first, second and third phase-change materials are within the target temperature range.

24. The system as claimed in claim 23 wherein the masses of the second and third phase-change materials are equal.

25. The system as claimed in claim 23 wherein the masses of the second and third phase-change materials are unequal.

26. The system as claimed in claim 25 wherein the mass of the second phase-change material is greater than the mass of the third phase-change material.

27. The system as claimed in claim 25 wherein the mass of the third phase-change material is greater than the mass of the second phase-change material.

28. The system as claimed in claim 23 further comprising an insulating member disposed between the product box and the second phase-change material.

29. The system as claimed in claim 23 wherein the first phase-change material is split into two subvolumes separated by an insulating member.

30. A system for use in maintaining one or more temperature-sensitive materials within a target temperature range for a period of time, the system comprising:

(a) an insulated container, the insulated container comprising at least a first wall and a cavity;

(b) a product box for holding a payload, the product box being positioned within the cavity, the product box comprising a first face;

(c) a first passive temperature-control member disposed within the cavity and positioned between the first wall and the first face, the first passive temperature-control member comprising a water-based phase-change material, the water-based phase-change material having a mass and being thermally preconditioned to a first temperature, the first temperature being below the target temperature range;

(d) a second passive temperature-control member disposed within the cavity and positioned between the first passive temperature-control member and the first face, the second passive temperature-control member comprising a first organic phase-change material, the first organic phase-change material having a mass and being at a second temperature, the second temperature being above the target temperature range;

(e) a third passive temperature-control member disposed within the cavity and positioned between the first passive temperature-control member and the first wall, the third passive temperature-control member comprising a third organic phase-change material, the third organic phase-change material having a mass and being at a third temperature, the third temperature being above the target temperature range;

(f) wherein the masses of the first, second and third phase-change materials are selected so that, at thermal equilibrium between the first, second and third phase-change materials, the first, second and third phase-change materials are within the target temperature range.

31. The system as claimed in claim 30 wherein the second and third organic phase-change materials are identical in chemical composition and wherein the second and third temperatures are identical.

32. A system for use in maintaining one or more temperature-sensitive materials within a target temperature range for a period of time, the system comprising:
(a) an insulated container, the insulated container comprising a cavity;
(b) a product box for holding a payload, the product box being positioned within the cavity, the product box comprising a top, a bottom, and a plurality of sides;
(c) a first phase-change material, the first phase-change material being positioned within the cavity together with the product box, the first phase-change material having a mass and being thermally preconditioned to a first temperature at packout, the first temperature being below the target temperature range, the first phase-change material comprising a top portion aligned with the top of the product box, a bottom portion aligned with the bottom of the product box, and a plurality of side portions aligned with the sides of the product box;
(d) a second phase-change material, the second phase-change material being positioned within the cavity together with the product box and the first phase-change material, the second phase-change material being different in chemical composition from the first phase-change material, the second phase-change material having a mass and being at a second temperature at packout, the second temperature being above the target temperature range, the second phase-change material comprising a top portion, a bottom portion, and a plurality of side portions, the top portion of the second phase-change material being positioned between the product box and the top portion of the first phase-change material, the bottom portion of the second phase-change material being positioned between the product box and the bottom portion of the first phase-change material, and the side portions of the second phase-change material being positioned between the product box and the side portions of the first phase-change material;
(e) a third phase-change material, the third phase-change material being positioned within the cavity together with the product box, the first phase-change material, and the second phase-change material, the third phase-change material being different in chemical composition from the first phase-change material, the third phase-change material having a mass and being at a third temperature at packout, the third temperature being above the target temperature range, the third phase-change material comprising a top portion, a bottom portion, and a plurality of side portions, the top portion of the first phase-change material being positioned between the top portion of the second phase-change material and the top portion of the third phase-change material, the bottom portion of the first phase-change material being positioned between the bottom portion of the second phase-change material and the bottom portion of the third phase-change material, and the side portions of the first phase-change material being positioned between the side portions of the second phase-change material and the side portions of the third phase-change material;
(f) wherein the masses of the first, second and third phase-change materials are selected so that, at thermal equilibrium between the first, second, and third phase-change materials, the first, second, and third phase-change materials are within the target temperature range.

33. The system as claimed in claim 32 wherein the first phase-change material is an aqueous phase-change material, wherein the second phase-change material and the third phase-change material are identical in chemical composition, wherein each of the second and third phase-change materials has a phase-change temperature within the target temperature range, wherein each of the second phase-change material and the third phase-change material comprises an n-alkane, and wherein the second temperature and the third temperature are identical and are room temperature.

34. The system as claimed in claim 33 wherein the second and third phase-change materials differ in mass.

35. The system as claimed in claim 32 wherein the first phase-change material comprises a plurality of layers of phase-change material.

* * * * *